(12) United States Patent
Zanaboni et al.

(10) Patent No.: US 10,633,524 B2
(45) Date of Patent: Apr. 28, 2020

(54) MULTILAYER HEAT SHRINKABLE FILMS

(71) Applicant: Cryovac, LLC, Charlotte, NC (US)

(72) Inventors: Giuliano Zanaboni, Trecate (IT); Flavio Fusarpoli, Rho (IT); Romano Spigaroli, Legnano (IT)

(73) Assignee: Cryovac, LLC, Charlotte, NC (US)

( * ) Notice: Subject to any disclaimer, the term of this patent is extended or adjusted under 35 U.S.C. 154(b) by 0 days.

(21) Appl. No.: 16/391,956

(22) Filed: Apr. 23, 2019

(65) Prior Publication Data

US 2019/0256697 A1 Aug. 22, 2019

Related U.S. Application Data

(63) Continuation of application No. 15/315,562, filed on Dec. 1, 2016, now abandoned.

(51) Int. Cl.
| | |
|---|---|
| *B29C 48/21* | (2019.01) |
| *C08L 23/08* | (2006.01) |
| *B32B 27/32* | (2006.01) |
| *B29C 48/00* | (2019.01) |
| *B29C 48/10* | (2019.01) |
| *B29C 48/88* | (2019.01) |
| *B65D 75/00* | (2006.01) |
| *B32B 27/08* | (2006.01) |
| *B32B 27/34* | (2006.01) |
| *B32B 27/36* | (2006.01) |
| *B65D 85/00* | (2006.01) |
| *B32B 27/30* | (2006.01) |
| *B32B 1/08* | (2006.01) |
| *B29C 48/91* | (2019.01) |
| *B29K 23/00* | (2006.01) |
| *B29K 27/00* | (2006.01) |
| *B29K 105/00* | (2006.01) |
| *B29L 31/00* | (2006.01) |
| *A23C 19/00* | (2006.01) |
| *A23L 13/00* | (2016.01) |

(52) U.S. Cl.
CPC ...... *C08L 23/0815* (2013.01); *B29C 48/0018* (2019.02); *B29C 48/022* (2019.02); *B29C 48/10* (2019.02); *B29C 48/21* (2019.02); *B29C 48/912* (2019.02); *B29C 48/9105* (2019.02); *B32B 1/08* (2013.01); *B32B 27/08* (2013.01); *B32B 27/304* (2013.01); *B32B 27/306* (2013.01); *B32B 27/32* (2013.01); *B32B 27/34* (2013.01); *B32B 27/36* (2013.01); *B65D 75/002* (2013.01); *B65D 85/70* (2013.01); *C08L 23/0846* (2013.01); *C08L 23/0853* (2013.01); *A23C 19/00* (2013.01); *A23L 13/00* (2016.08); *A23V 2002/00* (2013.01); *B29K 2023/083* (2013.01); *B29K 2027/08* (2013.01); *B29K 2105/0085* (2013.01); *B29K 2995/0049* (2013.01); *B29K 2995/0053* (2013.01); *B29K 2995/0067* (2013.01); *B29L 2031/7128* (2013.01); *B32B 2250/24* (2013.01); *B32B 2270/00* (2013.01); *B32B 2307/31* (2013.01); *B32B 2307/518* (2013.01); *B32B 2307/7242* (2013.01); *B32B 2307/7244* (2013.01); *B32B 2307/736* (2013.01); *B32B 2439/06* (2013.01); *B32B 2439/46* (2013.01); *B32B 2439/70* (2013.01); *C08L 2203/162* (2013.01)

(58) Field of Classification Search
CPC .............. C08L 23/0815; C08L 23/0853; C08L 23/0846; C08L 51/06; C08L 23/04; C08L 2207/162; C08L 2207/064; B32B 27/36; B32B 27/08; B32B 1/08; B32B 27/304; B32B 27/306; B32B 27/32; B32B 27/34; B32B 2307/7242; B32B 2250/24; B32B 2307/736; B32B 2439/70; B32B 2307/083; B32B 2307/7244; B32B 2270/00; B32B 2439/06; B32B 2307/518; B32B 2439/46; B32B 2307/31; C09J 123/04; B29C 48/0018; B29C 48/21; B29C 48/912; B29C 48/10; B29C 48/022; B29C 48/9105; B65D 85/70; B65D 75/002; A23C 19/166; A23C 19/00; B29K 2105/0085; B29K 2023/033; B29K 2027/08; B29K 2995/0049; B29K 2995/0053; B29K 2992/0067; B29L 2031/7128; A23L 13/00

See application file for complete search history.

(56) References Cited

U.S. PATENT DOCUMENTS

| | | | |
|---|---|---|---|
| 4,064,296 A | 12/1977 | Bornstein et al. | |
| 4,302,565 A | 11/1981 | Goeke et al. | |
| 4,302,566 A | 11/1981 | Karol et al. | |
| 4,589,247 A | 5/1986 | Tsuruta et al. | |
| 5,026,798 A | 6/1991 | Canich | |
| 5,382,470 A | 1/1995 | Vicik | |
| 6,790,468 B1 | 4/2004 | Mize et al. | |

(Continued)

FOREIGN PATENT DOCUMENTS

| | | |
|---|---|---|
| CN | 1190367 A | 8/1998 |
| DE | 102004042968 A1 | 3/2006 |

(Continued)

*Primary Examiner* — Nathan M Nutter
(74) *Attorney, Agent, or Firm* — Jason R. Womer

(57) ABSTRACT

The present invention relates to a polymer blend and to multilayer heat shrinkable films containing at least a layer made of said polymer blend, to flexible containers made of said film, such as bags, pouches and the like, useful for packaging articles, in particular food items. The invention also relates to a process for the manufacturing of such multilayer heat shrinkable films.

20 Claims, 1 Drawing Sheet

(56) References Cited

U.S. PATENT DOCUMENTS

| | | |
|---|---|---|
| 6,764,729 B2 | 7/2004 | Ramesh et al. |
| 2003/0181553 A1 | 9/2003 | Moriya et al. |
| 2004/0048086 A1* | 3/2004 | Kennedy et al. ....... B32B 27/08 428/517 |
| 2004/0151934 A1 | 8/2004 | Schwark et al. |
| 2007/0031691 A1 | 2/2007 | Forloni et al. |
| 2009/0321300 A1 | 12/2009 | Komiya et al. |

FOREIGN PATENT DOCUMENTS

| | | |
|---|---|---|
| EA | 18678 B1 | 9/2013 |
| EP | 2030784 A1 | 3/2009 |
| EP | 2064056 B1 | 6/2009 |
| JP | S5513718 A | 1/1980 |
| JP | H0740512 A | 2/1995 |

* cited by examiner

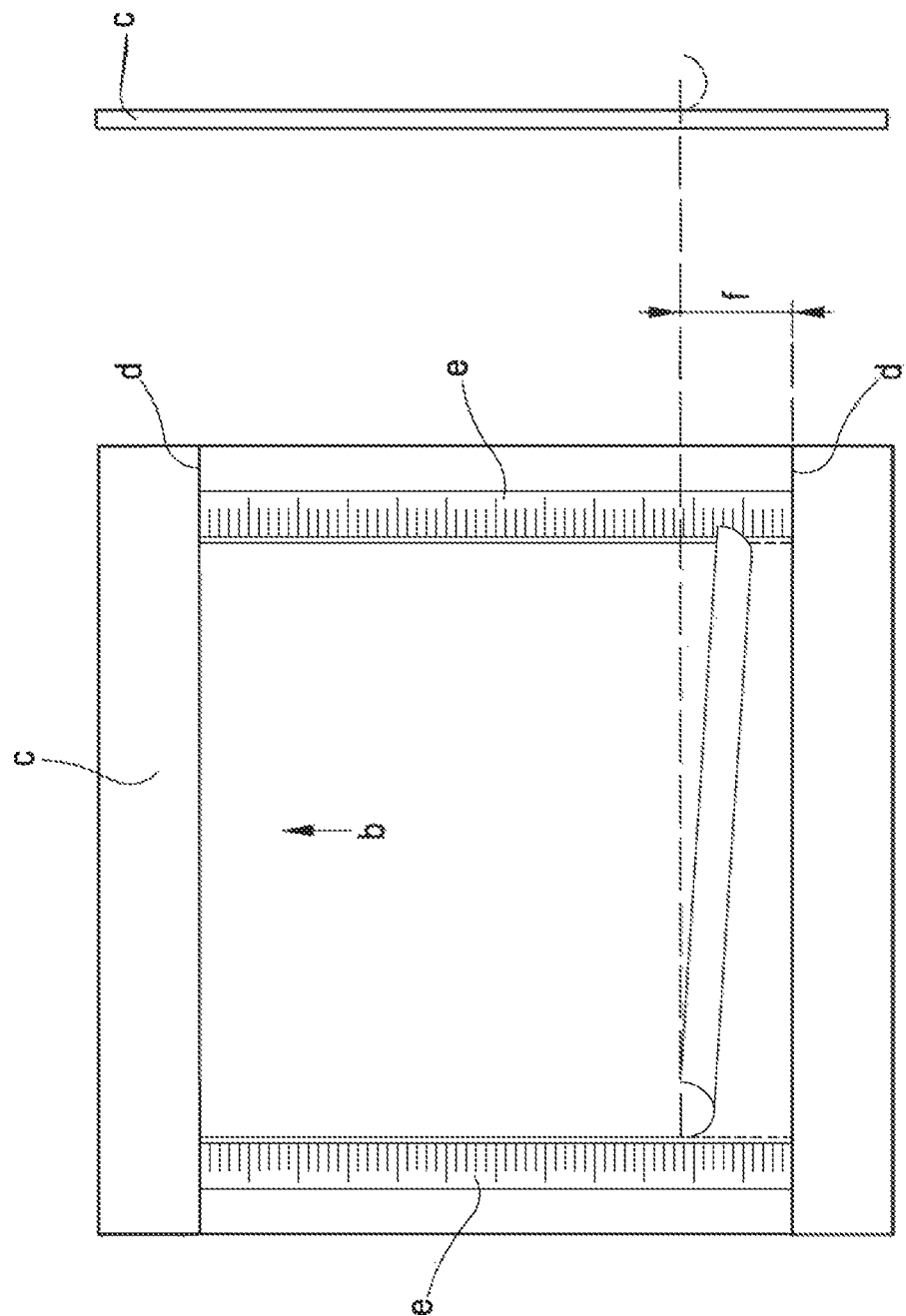

MULTILAYER HEAT SHRINKABLE FILMS

CROSS-REFERENCE TO RELATED APPLICATIONS

This application is a continuation of U.S. patent application Ser. No. 15/315,562, filed Dec. 1, 2016 and entitled Multilayer Heat Shrinkable Films and claims the benefit of PCT/EP2015/061911, filed May 28, 2015, and EP Application No. 14170434.6 filed May 28, 2014, the entirety of which are incorporated herein by reference.

TECHNICAL FIELD

The present invention relates to multilayer heat shrinkable films and to flexible containers made therefrom, such as bags, pouches and the like, useful for packaging articles, in particular food items. The invention also relates to a process for the manufacturing of such multilayer heat shrinkable films.

BACKGROUND ART

Heat-shrinkable packaging films have been used for the packaging of a variety of products. Through the years, several efforts have been done in the technical field to improve the pack appearance by optimizing shrink and optical properties of the films, as well as to increase their stiffness in order to improve abuse resistance and machinability.

Concerning the shrinking properties, an ideal packaging film should have the correct balance of free shrink, maximum shrink tension and residual shrink tension in order to provide packages with an appealing appearance and a satisfactory functionality, which should be preserved under the most common packaging and storage conditions and over time for the entire package life.

Any deviation of the optimal values of said shrinking properties may be detrimental to the performance of the film in the final package.

For instance, too low free shrink values may result in a pack appearance unacceptable for the customer due to the looseness of the film and to the presence of wrinkles.

This is particularly true for the vacuum packaging of meat products, particularly fresh meat products. Upon evacuating the atmosphere from the package followed by heat-sealing of the film, the resulting closed package should tightly shrink around the meat product. A film endowed with a sufficiently high free shrink retracts against the product, reducing the excess of film protruding away from the packaged product and improving the appearance and the function of the package.

At this shrinking step, it is essential that the films develop proper free shrink values in both the directions together with an appropriate shrink force. This force must be high enough to tightly enclose the product within the film but without crashing or excessively distorting the final package. The free shrink and the maximum shrink tension, i.e. the maximum value of tension developed by the films during the heating/shrinking process, are thus parameters very important for achieving an optimal package appearance.

Another important requirement is that the packages should remain tight overtime during handling and storage.

In fact, one common inconvenient that occurs during the storage into the refrigerator is the so called "package relaxation", namely the loss of pack tightness and the appearance of anti-aesthetical wrinkles and pleats in the packaging film.

Package relaxation is not only undesirable for purely aesthetical reasons—the presence of wrinkles in the film of the package is not attractive per se—but also because it may impair the visual inspection of the packaged product and thus instill doubts concerning the freshness and the proper storage of the food. The measurement of the residual shrink tension at typical fridge temperatures can help to foresee any package relaxation and accordingly improve film properties.

Other important requirements of the package, for the consumer perception, are the optical properties, namely its transparency and its gloss. The transparency allows the consumer to "see through" the package and inspect the product and additionally, a glossy package is undoubtedly more attractive. Particularly in the case of barrier shrink films, where the barrier layer is for example EVOH or PVDC, the wrinkling of the barrier layer due to the high shrink of the film causes a significant worsening of the optics, especially in terms of the haze of the film.

For these reasons, it is crucial to preserve as much as possible excellent optical properties after the shrink, especially in the case of highly shrinking barrier films.

An improved stiffness of the film generally results in packages with less leakers leakers which are due to accidental openings or ruptures during the packaging process or handling of the packages. More rigid films also provide for an improved machinability, which allows decreasing the number of rejects and increasing the speed of packaging cycles. In fact, a film having good machinability is less subject to creasing, folding, seal pleats, edge curls, or jamming and can be more easily used with any packaging machine. Additionally, more stiff films provide for flexible containers which are easier to be loaded with the product and they generally show improved printability and converting.

Two main different strategies to impart stiffness have been applied in the art: film thickness was increased and abuse resistant resins, in particular polyesters and polyamides, were added. Both the strategies had some negative consequences in terms of process efficiency and costs.

Moreover, in case of shrinkable films, it has been observed that an increase in the stiffness often results in undesired shrinking properties and in worsened optical characteristics (e.g., gloss, haze before and after shrink).

The addition of abuse resistant resins, also herein named as "stiff resins", in particular of high melting point polymers, such as polyamides or particularly aromatic polyesters, resulted in further issues.

First, when these films incorporate a barrier layer comprising PVDC, the different thermal behaviour and stability of the barrier polymers with respect to the abuse resistant resins, make the manufacturing process of the film very difficult.

In particular, films including high melting polyesters, such as aromatic (co)polyesters, together with a thermolabile PVDC barrier layer, would be hardly obtainable with conventional extrusion dies and/or processes, namely by co-extrusion of all layers—as taught in WO2005011978 or EP2147783—or by extrusion coating of a substrate with a coating, in which the coating comprises both PVDC and PET—as suggested in EP2030784.

The Applicant found out that by applying said conventional processes with traditional extrusion dies to the manufacture of the present films, there may occur so much damage of the PVDC layer that the final film would not be acceptable in terms of colour, oxygen transmission and/or optics. In fact, the Applicant observed that the temperatures applied to extrude polyamides and especially aromatic polyesters are generally so high—e.g. up to 270-280° C.—to induce partial degradation of the PVDC barrier layer, with appearance of undesired yellow brown colors and possible deterioration of gas barrier performance. In this regard, the state of the art provides little or no teaching on how to solve the problem of thermal incompatibility and how successfully manufacturing this kind of films.

Additionally, if the structure of the films is not symmetrical, incorporation of high amounts of abuse resistant resins may cause or worsen the so called "curling effect", i.e. the tendency of the edges to roll up when the film or tubing are cut.

Of course, both at manufacturing and customer level it is most desirable that the tubing or the film stay flat when cut. When the tubing or web curls, it becomes really difficult (or even impossible) to run the standard converting operations like bag-making, slitting, printing, unfolding.

Curling is also a serious issue at customer level because it makes difficult running the bags on the automatic machines (bags loader, FIFFS machine, thermoform-shrink machine) and dramatically increases the rejects due to wrong bags opening and/or web positioning.

In addition, for complex film formulations comprising barrier layers (for example EVOH or PVDC) and some layers of stiff resins, such as polyesters and polyamides, the set-up of the extrusion process is more critical and requires several line adjustments before finding a good compromise of process yield vs. film properties.

Such formulations also generate other problems in terms of sealability and bond strength between the various layers of the structures.

There is still the need for new barrier heat shrinkable films endowed with good optical properties after shrink, very good sealability and appropriate bond strength between the various layers of the films, good processability and rigidity but reduced curling to ensure robustness/easy handling at converting and printing.

DISCLOSURE OF THE INVENTION

The Applicant has found that, very good optical properties after shrink can be imparted to PVDC barrier films by using a specifically formulated adhesive (tie) layer on at least one side of the barrier layer.

Moreover, the Applicant surprisingly found that this tie layer can also ensure very good adhesion between the heat sealable layer and, if present, polyamide, polyester, or styrene-base polymers layer(s).

The Applicant found out that an excellent sealability and a reduced curling of PVDC barrier films containing stiff polymers, such as polyamides and polyesters, can be obtained by selecting the relative amounts of such stiff resins with respect to the sealant resin and their respective position. The peculiar content and proper disposition of the layers in said multilayer films comprising a PVDC barrier layer allow the incorporation of significant amount of stiff resins, resulting in asymmetric stiff films, which are surprisingly endowed with negligible curling, as well as good optical, shrink and abuse properties.

In addition, the Applicant was able to manufacture PVDC barrier films comprising very high melting aromatic (co) polyesters, even by using conventional equipment, thanks to a new extrusion-coating process. The Applicant found out that by placing the PVDC thermolabile layer in the substrate and the high melting (co)polyester in the coating, it was possible to preserve PVDC from degradation. In fact, the PVDC layer within the substrate is not heated at a too high temperature, as the high melting aromatic (co)polyesters are in the coating. Furthermore, the Applicant was also able to further minimize heat transmission during the coating of the substrate by inserting a certain thickness of insulating layers between the PVDC layer and the aromatic (co)polyester layer(s). Thanks to the thermal insulating function of said additional layers and/or to the particular manufacturing process, it was possible to preserve the PVDC layer from thermal degradation during processing.

It is thus a first object of the present invention a polymer blend comprising:
from 50% to 85% by weight of at least a modified ethylene-alpha-olefin copolymer;
from 50% to 15% by weight of at least a modified ethylene and vinyl acetate copolymer having a percentage by weight of vinyl acetate between 6% and 15%.

A second object of the present invention is a multilayer heat-shrinkable film comprising at least:
a first outer heat sealable layer (a),
an inner barrier layer (b) comprising polyvinylidene chloride (PVDC) said layer having a first surface and a second surface;
at least one tie layer (c) being positioned directly adhered to the first surface or to the second surface of the inner barrier layer (b),
characterized in that said tie layer (c) comprises, preferably consists of, the polymer blend according to the first object of the present invention.

A third object of the present invention is a process for the manufacture of a film according to the second object of the present invention.

A fourth object of the present invention is an article for packaging in the form of a seamless tube, wherein the heat-sealing layer is the innermost layer of the tube or in the form of a flexible container, such as a pouch or bag, obtainable by heat-sealing—a film according to the second object to itself.

A fifth object of the present invention is a package comprising an article according to the fourth object and a product packaged in said article.

A sixth object of the present invention is the use of a polymer blend according to the first object of the present invention in the manufacture of a film for packaging, preferably a film according to the second object of the present invention and the use of said film for packaging, preferably for food packaging.

Definitions

As used herein, the term "film" is inclusive of plastic web, regardless of whether it is film or sheet or tubing.

As used herein, the terms "inner layer" and "internal layer" refer to any film layer having both of its principal surfaces directly adhered to another layer of the film.

As used herein, the phrase "outer layer" or "external layer" refers to any film layer having only one of its principal surfaces directly adhered to another layer of the film.

As used herein, the phrases "seal layer", "sealing layer", "heat seal layer", and "sealant layer", refer to an outer layer involved in the sealing of the film to itself, to another layer of the same or another film, and/or to another article which is not a film.

As used herein, the words "tie layer" or "adhesive layer" refer to any inner film layer having the primary purpose of adhering two layers to each other.

As used herein, the phrases "longitudinal direction" and "machine direction", herein abbreviated "LD" or "MD", refer to a direction "along the length" of the film, i.e., in the direction of the film as the film is formed during coextrusion.

As used herein, the phrase "transverse direction" or "crosswise direction", herein abbreviated "TD", refers to a direction across the film, perpendicular to the machine or longitudinal direction.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, i.e., an extruder, which forces the polymeric material through the die.

As used herein, the term "coextrusion" refers to the process of extruding two or more materials through a single die with two or more orifices arranged so that the extrudates merge and weld together into a laminar structure before chilling, i.e., quenching. Coextrusion can be employed in film blowing and extrusion coating processes.

As used herein, the term "extrusion coating" refers to processes by which a "coating" of molten polymer(s), comprising one or more layers, is extruded onto a solid "substrate" in order to coat the substrate with the molten polymer coating to bond the substrate and the coating together, thus obtaining a complete film.

As used herein the terms "coextrusion", "coextruded", "extrusion coating" and the like are referred to processes and multilayer films which are not obtained by sole lamination, namely by gluing or welding together pre-formed webs.

As used herein, the term "orientation" refers to "solid state orientation" namely to the process of stretching of the cast film carried out at a temperature higher than the Tg (glass transition temperatures) of all the resins making up the layers of the structure and lower than the temperature at which all the layers of the structure are in the molten state. The solid state orientation may be mono-axial, transverse or, preferably, longitudinal, or, preferably, bi-axial.

As used herein, the phrases "orientation ratio" and "stretching ratio" refer to the multiplication product of the extent to which the plastic film material is expanded in the two directions perpendicular to one another, i.e. the machine direction and the transverse direction. Thus, if a film has been oriented to three times its original size in the longitudinal direction (3:1) and three times its original size in the transverse direction (3:1), then the overall film has an orientation ratio of 3×3 or 9:1.

As used herein the phrases "heat-shrinkable," "heat-shrink," and the like, refer to the tendency of the solid-state oriented film to shrink upon the application of heat, i.e., to contract upon being heated, such that the size of the film decreases while the film is in an unrestrained state. As used herein said term refers to solid-state oriented films with a free shrink in both the machine and the transverse directions, as measured by ASTM D 2732, of at least 10%, preferably at least 15%, even more preferably of at least 20% at 85° C.

As used herein the phrases "total free shrink" means the sum of the percentage of free shrink in the machine (longitudinal) direction and the percentage of free shrink in the transverse (crosswise) direction. The total free shrink is expressed as percentage (%).

As used herein, the phrase "process stability" is interchangeable with the term "processability" and refers to the stability of the film during manufacturing, at extrusion, orientation and converting levels.

As used herein, the term "polymer" refers to the product of a polymerization reaction, and is inclusive of homopolymers, and co-polymers.

As used herein, the term "homo-polymer" is used with reference to a polymer resulting from the polymerization of a single monomer, i.e., a polymer consisting essentially of a single type of mer, i.e., repeating unit.

As used herein, the term "co-polymer" refers to polymers formed by the polymerization reaction of at least two different monomers. For example, the term "co-polymer" includes the co-polymerization reaction product of ethylene and an alpha-olefin, such as 1-hexene. When used in generic terms the term "co-polymer" is also inclusive of, for example, ter-polymers. The term "co-polymer" is also inclusive of random co-polymers, block co-polymers, and graft co-polymers.

As used herein, the phrase "heterogeneous polymer" or "polymer obtained by heterogeneous catalysis" refers to polymerization reaction products of relatively wide variation in molecular weight and relatively wide variation in composition distribution, i.e., typical polymers prepared, for example, using conventional Ziegler-Natta catalysts, for example, metal halides activated by an organometallic catalyst, i.e., titanium chloride, optionally containing magnesium chloride, complexed to trialkyl aluminium and may be found in patents such as U.S. Pat. No. 4,302,565 to Goeke et al. and U.S. Pat. No. 4,302,566 to Karol, et al. Heterogeneous catalyzed copolymers of ethylene and an -olefin may include linear low-density polyethylene, very low-density polyethylene and ultra low-density polyethylene. Some copolymers of this type are available from, for example, The Dow Chemical Company, of Midland, Mich., U.S.A. and sold under the trademark DOWLEX resins.

As used herein, the phrase "homogeneous polymer" or "polymer obtained by homogeneous catalysis" refers to polymerization reaction products of relatively narrow molecular weight distribution and relatively narrow composition distribution. Homogeneous polymers are structurally different from heterogeneous polymers, in that homogeneous polymers exhibit a relatively even sequencing of co-monomers within a chain, a mirroring of sequence distribution in all chains, and a similarity of length of all chains, i.e., a narrower molecular weight distribution. This term includes those homogeneous polymers prepared using metallocenes, or other single-site type catalysts, as well as those homogenous polymers that are obtained using Ziegler Natta catalysts in homogenous catalysis conditions.

The co-polymerization of ethylene and alpha-olefins under homogeneous catalysis, for example, co-polymerization with metallocene catalysis systems which include constrained geometry catalysts, i.e., monocyclopentadienyl transition-metal complexes is described in U.S. Pat. No. 5,026,798 to Canich. Homogeneous ethylene/alpha-olefin copolymers (E/AO) may include modified or unmodified ethylene/alpha-olefin copolymers having a long-chain branched (8-20 pendant carbons atoms) alpha-olefin comonomer available from The Dow Chemical Company, known as AFFINITY and ATTANE resins, TAFMER linear copolymers obtainable from the Mitsui Petrochemical Corporation of Tokyo, Japan, and modified or unmodified ethylene/-olefin copolymers having a short-chain branched (3-6 pendant carbons atoms)-olefin comonomer known as EXACT resins obtainable from ExxonMobil Chemical Company of Houston, Tex., U.S.A. As used herein, the term "polyolefin" refers to any polymerized olefin, which can be linear, branched, cyclic, aliphatic, aromatic, substituted, or unsubstituted. More specifically, included in the term polyolefin are homo-polymers of olefin, co-polymers of olefin, co-polymers of an olefin and an non-olefinic co-monomer co-polymerizable with the olefin, such as vinyl monomers, modified polymers thereof, and the like. Specific examples include polyethylene homo-polymer, polypropylene homo-polymer, polybutene homo-polymer, ethylene-alpha-olefin which are copolymers of ethylene with one or more -olefins (alpha-olefins) such as butene-1, hexene-1, octene-1, or the like as a comonomer, and the like, propylene-alpha-olefin co-polymer, butene-alpha-olefin co-polymer, ethylene-unsaturated ester co-polymer, ethylene-unsaturated acid co-polymer, (e.g. ethylene-ethyl acrylate co-polymer, ethylene-butyl acrylate co-polymer, ethylene-methyl acrylate co-polymer, ethylene-acrylic acid co-polymer, and ethylene-methacrylic acid co-polymer), ethylene-vinyl acetate copolymer, ionomer resin, polymethylpentene, etc.

As used herein the terra "ionomer" refers to the products of polymerization of ethylene with an unsaturated organic acid, and optionally also with an unsaturated organic acid ($C_1$-$C_4$)-alkyl ester, partially neutralized with a mono- or divalent metal ion, such as lithium, sodium, potassium, calcium, magnesium and zinc. Typical unsaturated organic acids are acrylic acid and methacrylic acid which are thermally stable and commercially available. Unsaturated organic acid ($C_1$-$C_4$)-alkyl esters are typically (meth)acrylate esters, e.g. methyl acrylate and isobutyl acrylate. Mixtures of more than one unsaturated organic acid comonomer and/or more than one unsaturated organic acid (C1-C4)-alkyl ester monomer can also be used in the preparation of the ionomer.

As used herein, the phrase "modified polymer", as well as more specific phrases such as "modified ethylene/vinyl acetate copolymer", "modified polyolefin" and "modified ethylene-alpha-olefin copolymer" refer to such polymers having an anhydride functionality, as defined immediately above, grafted thereon and/or copolymerized therewith and/or blended therewith. Preferably, such modified polymers have the anhydride functionality grafted on or polymerized therewith, as opposed to merely blended therewith. As used herein, the term "modified" refers to a chemical derivative, e.g. one having any form of anhydride functionality, such as anhydride of maleic acid, crotonic acid, citraconic acid, itaconic acid, fumaric acid, etc., whether grafted onto a polymer, copolymerized with a polymer, or blended with one or more polymers, and is also inclusive of derivatives of such functionalities, such as acids, esters, and metal salts derived therefrom. As used herein, the phrase "anhydride-containing polymer" and "anhydride-modified polymer", refer to one or more of the following: (1) polymers obtained by copolymerizing an anhydride-containing monomer with a second, different monomer, and (2) anhydride grafted copolymers, and (3) a mixture of a polymer and an anhydride-containing compound.

As used herein, the phrase "ethylene-alpha-olefin copolymer" refers to heterogeneous and to homogeneous polymers such as linear low density polyethylene (LLDPE) with a density usually in the range of from about 0.900 g/cm$^3$ to about 0.930 g/cm$^3$, linear medium density polyethylene (LMDPE) with a density usually in the range of from about 0.930 g/cm$^3$ to about 0.945 g/cm$^3$, and very low and ultra low density polyethylene (VLDPE and ULDPE) with a density lower than about 0.915 g/cm$^3$, typically in the range 0.868 to 0.915 g/cm$^3$, and such as metallocene-catalyzed EXACT™ and EXCEED™ homogeneous resins obtainable from Exxon, single-site AFFINITY™ resins obtainable from Dow, and TAFMER™ homogeneous ethylene-alpha-olefin copolymer resins obtainable from Mitsui. All these materials generally include co-polymers of ethylene with one or more co-monomers selected from ($C_4$-$C_{10}$)-alpha-olefin such as butene-1, hexene-1, octene-1, etc., in which the molecules of the copolymers comprise long chains with relatively few side chain branches or cross-linked structures.

As used herein, terms identifying polymers, such as "polyimide", "polyester", "polyurethane", etc. are inclusive of not only polymers comprising repeating units derived from monomers known to polymerize to form a polymer of the named type, but are also inclusive of comonomers, derivatives, etc. which can copolymerize with monomers known to polymerize to produce the named polymer. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of mixtures, blends, etc. of such polymers with other polymers of a different type.

As used herein the term "polyamide" refers to high molecular weight polymers having amide linkages along the molecular chain, and refers more specifically to synthetic polyamides such as nylons. Such term encompasses both homo-polyamides and co-(or ter-) polyamides. It also specifically includes aliphatic polyamides or co-polyamides, aromatic polyamides or co-polyamides, and partially aromatic polyamides or co-polyamides, modifications thereof and blends thereof. The homo-polyamides are derived from the polymerization of a single type of monomer comprising both the chemical functions, which are typical of polyamides, i.e. amino and acid groups, such monomers being typically lactams or aminoacids, or from the polycondensation of two types of polyfunctional monomers, i.e. polyamines with polybasic acids. The co-, ter-, and multi-polyamides are derived from the copolymerization of precursor monomers of at least two (three or more) different polyamides. As an example in the preparation of the co-polyamides, two different lactams may be employed, or two types of polyamines and polyacids, or a lactam on one side and a polyamine and a polyacid on the other side. Exemplary polymers are polyamide 6, polyamide 6/9, polyamide 6/10, polyamide 6/12, polyamide 11, polyamide 12, polyamide 6/12, polyamide 6/66, polyamide 66/6/10, modifications thereof and blends thereof. Said term also includes crystalline or partially crystalline, aromatic or partially aromatic polyamides.

As used herein, the phrase "amorphous polyamide" refers to polyamides or nylons with an absence of a regular three-dimensional arrangement of molecules or subunits of molecules extending over distances, which are large relative to atomic dimensions. However, regularity of structure exists on a local scale. See, "Amorphous Polymers," in Encyclopaedia of Polymer Science and Engineering, 2nd Ed., pp. 789-842 (Jr. Wiley & Sons, Inc. 1985). This document has a Library of Congress Catalogue Card Number of 84-19713. In particular, the term "amorphous polyamide" refers to a material recognized by one skilled in the art of differential scanning calorimetry (DSC) as having no measurable melting point (less than 0.5 cal/g) or no heat of fusion as measured by DSC using ASTM 3417-83. Such nylons include those amorphous nylons prepared from condensation polymerization reactions of diamines with dicarboxylic acids. For example, an aliphatic diamine is combined with an aromatic dicarboxylic acid, or an aromatic diamine is combined with an aliphatic dicarboxylic acid to give suitable amorphous nylons.

As used herein, the term "adhered" is inclusive of films which are directly adhered to one another using a heat-seal or other means, as well as films which are adhered to one another using an adhesive which is between the two films.

As used herein, the phrase "directly adhered", as applied to layers, is defined as adhesion of the subject layer to the object layer, without a tie layer, adhesive, or other layer therebetween.

In contrast, as used herein, the word "between", as applied to a layer expressed as being between two other specified layers, includes both direct adherence of the subject layer to the two other layers it is between, as well as a lack of direct adherence to either or both of the two other layers the subject layer is between, i.e., one or more additional layers can be imposed between the subject layer and one or more of the layers the subject layer is between.

As used herein the term "gas-barrier" when referred to a layer, to a resin contained in said layer, or to an overall structure, refers to the property of the layer, resin or structure, to limit to a certain extent passage through itself of gases.

When referred to a layer or to an overall structure, the term "gas-barrier" is used herein to identify layers or structures characterized by an Oxygen Transmission Rate (evaluated at 23° C. and 0% R. H. according to ASTM D-3985) of less than 500 $cm^3/m^2 \cdot day \cdot atm$, preferably lower than 100 $cm^3/m^2 \cdot day \cdot atm$, even more preferably lower than 50 $cm^3/m^2 \cdot day \cdot atm$.

As used herein, the phrase "flexible container" is inclusive of end-seal bags, side-seal bags, L-seal bags, U-seal bags (also referred to as "pouches"), gusseted bags, back-seamed tubings, and seamless casings.

As used herein, the phrase "an article for packaging in the form of a seamless tube" relates to a tube devoid of any seal, which is generally made of a multilayer film (co)extruded through a round die, optionally oriented, wherein the heat-sealing layer (a) is the innermost layer of the tube.

As used herein, the term "package" is inclusive of packages made from such articles, i.e. containers or tubes, by placing a product in the article and sealing the article so that the product is substantially surrounded by the heat-shrinkable multilayer film from which the packaging container is made.

As used herein, the term "bag" refers to a packaging container having an open top, side edges, and a bottom edge. The term "bag" encompasses lay-flat bags, pouches, casings (seamless casings and back-seamed casings, including lap-sealed casings, fin-sealed casings, and butt-sealed back-seamed casings having back-seaming tape thereon). Various casing configurations are disclosed in U.S. Pat. No. 6,764,729 and various bag configurations, including L-seal bags, back-seamed bags, and U-seal bags (also referred to as pouches), are disclosed in U.S. Pat. No. 6,790,468.

Unless otherwise stated, all the percentages are meant to be percentages by weight.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which:

FIG. 1 is a schematic view of test method for measuring the curling effect of a piece of film.

DETAILED DESCRIPTION OF THE INVENTION

A first object of the present invention is a polymer blend comprising:
from 50% to 85% by weight of at least a modified ethylene-alpha-olefin copolymer;
from 50% to 15% by weight of at least a modified ethylene and vinyl acetate copolymer having a percentage by weight of vinyl acetate between 6% and 15%,
preferably:
from 60% to 80% by weight of at least a modified ethylene-alpha-olefin copolymer;
from 40% to 20% by weight of at least a ethylene and vinyl acetate copolymer having a percentage by weight of vinyl acetate between 6% and 15%,
even more preferably:
from 65% to 75% by weight of at least a modified ethylene-alpha-olefin copolymer;
from 35% to 25% by weight of at least a ethylene and vinyl acetate copolymer having a percentage by weight of vinyl acetate between 6% and 15%.

In a preferred embodiment, the blend consists of said copolymers in said amounts.

The modified ethylene-alpha-olefin copolymer generally include co-polymers of ethylene with one or more co-monomers selected from $(C_4-C_{10})$-alpha-olefin such as butene-1, hexene-1, octene-1, etc., in which the molecules of the copolymers comprise long chains with relatively few side chain branches or cross-linked structures.

The modified ethylene-alpha-olefin copolymers, which can be used for the blend according to the first object of the invention, are selected among modified heterogeneous and homogeneous polymers, such as modified linear low density polyethylene (LLDPE) with a density usually in the range of from about 0.900 $g/cm^3$ to about 0.930 $g/cm^3$, modified linear medium density polyethylene (LMDPE) with a density usually in the range of from about 0.930 $g/cm^3$ to about 0.945 $g/cm^3$, and modified very low and ultralow density polyethylene (VLDPE and ULDPE) with a density lower than about 0.915 $g/cm^3$, typically in the range 0.868 to 0.915 $g/cm^3$.

The term "modified ethylene-alpha-olefin copolymer" refers to ethylene-alpha-olefin copolymer comprising at least an anhydride functionality, as defined immediately below, grafted thereon and/or copolymerized therewith and/or blended therewith.

Preferably, the blend according to the invention comprises at least a modified ethylene-alpha-olefin copolymer wherein the modified ethylene-alpha-olefin copolymer is an ethylene-alpha-olefin copolymer comprising at least one anhydride functionality grafted thereon and/or copolymerized therewith and/or blended therewith. Preferably, said anhydride functionality is selected among anhydride of maleic acid, crotonic acid, citraconic acid, itaconic acid and fumaric acid.

Preferably, such modified polymers have the anhydride functionality grafted on or polymerized therewith, as opposed to merely blended therewith.

As used herein, the term "modified" refers to a chemical derivative, e.g. one having any form of anhydride functionality, such as anhydride of maleic acid, crotonic acid, citraconic acid, itaconic acid, fumaric acid, etc., whether grafted onto a polymer, copolymerized with a polymer, or blended with one or more polymers, and is also inclusive of derivatives of such functionalities, such as acids, esters, and metal salts derived therefrom. Particularly preferred are maleic anhydride grades.

In the preferred embodiment, the density of the modified ethylene-alpha-olefin copolymer is in the range 0.905 g/cc to 0.927 g/cc, even more preferably in the range 0.910 g/cc to 0.920 g/cc. The Melt Flow Index of the of the modified ethylene-alpha-olefin copolymer, measured at 190° C., 2.16 kg (ASTM D1238) is generally in the range from 2 to 10 g/10 min, preferably at least 3 g/10 min, even more preferably at least 4 g/10 min.

Particularly preferred are Admer® NF 538E (anhydride modified very low density polyethylene, density 0.91 g/cc, melt index 4.1 g/10 min at 190° C., 2.16 kg), Admer® NT518E (Maleic Anhydride-Modified Polyethylene, Linear Low Density, density 0.91 g/cc, melt index 3.1 g/10 min at 190° C., 2.16 kg) and Admer® NF911E (Maleic Anhydride-Modified Polyethylene, Linear Low Density, density 0.90 g/cc, melt index 2.5 g/10 min at 190° C., 2.16 kg) commercialised by Mitsui Chemical.

Other commercially available resins which can be used are for example: Bynel 4125 by DuPont (Melt Flow Index 2.5 g/10 min at 190° C., 2.16 kg, density 0.926 g/cc), Plexar PX3243 by the LyondellBasell (Melt Flow Index 4.5 g/10 min at 190° C., 2.16 kg, density 0.927 g/cc), Amplify TY 1354 by Dow (Melt Flow Index 3.0 g/10 min at 190° C., 2.16 kg, density 0.92 g/cc).

The ethylene-vinyl acetate copolymer (EVA) are copolymer between ethylene and vinyl acetate, (this monomer is represented by the general formula: $CH_3COOCH=CH_2$).

In the modified EVA copolymer, the ethylene units are present in a major amount and the vinyl-acetate units are present in a minor amount. The typical amount of vinyl-acetate may range from about 5 to about 20%. For the blend according to the first object of the present invention, the percentage by weight of vinyl acetate has to be between 6% and 15%, preferably between 8% and 13%.

The Melt Flow Index of such resins is typically in the range 2.0 to 5.5 g/10 min, preferably 2.5-4.5 g/10 min (measured at 190° C., 2.16 kg, as per ASTM D1238).

The melting point of such resins is preferably comprised in the range from 87° C. to 100° C.

The term "modified ethylene-vinyl acetate copolymer" refers to ethylene-vinyl acetate copolymer having an anhydride functionality, as defined immediately below, grafted thereon and/or copolymerized therewith and/or blended therewith.

Preferably, such modified polymers have the anhydride functionality grafted on or polymerized therewith, as opposed to merely blended therewith.

As used herein, the term "modified" refers to a chemical derivative, e.g. one having any form of anhydride functionality, such as anhydride of maleic acid, crotonic acid, citraconic acid, itaconic acid, fumaric acid, etc., whether grafted onto a polymer, copolymerized with a polymer, or blended with one or more polymers, and is also inclusive of derivatives of such functionalities, such as acids, esters, and metal salts derived therefrom. Particularly preferred are maleic anhydride grades. Exemplary commercially available modified EVA resins are: Bynel 3101 by DuPont, Bynel 30E671 by Du Pont, Orevac 9314 by Arkema.

Preferably, the blend of the present invention comprises from 65% to 75% by weight of at least a modified ethylene-alpha-olefin copolymer having a density between 0.910 and 0.920 g/cc and from 35% to 25% by weight of at least a modified ethylene and vinyl acetate copolymer having a percentage by weight of vinyl acetate between 6% and 15%, more preferably between 8% and 13%.

A second object of the present invention is a multilayer heat-shrinkable film comprising at least:
 a first outer heat sealable layer (a),
 an inner barrier layer (b) comprising polyvinylidene chloride (PVDC) said layer having a first surface and a second surface;
 at least one tie layer (c) being positioned directly adhered to the first surface or to the second surface of the inner barrier layer (b),
characterized in that said tie layer (c) comprises, preferably consists of, the polymer blend according to the first object of the present invention.

The total thickness of the multilayer film is generally not higher than 250 microns and can be selected depending on the product to be packaged and on the packaging process. The total thickness of the film is preferably from 10 to 150 microns, more preferably from 20 to 120 microns, even more preferably from 30 to 100 microns.

Such films have preferably a total free shrink at 85° C. of at least 40%, preferably at least 50%, even more preferably at least 60%. The total free shrink in the sum of the free shrink percentage values measured in the two directions of the films, longitudinal and transverse, according to ASTM D2731.

Such films have preferably a haze after shrink value lower than 40%, lower than 30%, preferably lower than 25%, more preferably lower than 15%, most preferably lower than 10%.

The numbers of layers of the films according to the present invention is generally from 4 to 50, preferably from 6 to 35, still more preferably it is lower than 20. In the preferred embodiment, the number of layers of the films according to the present invention is from 6 to 15, even more preferably from 7 to 12.

In a preferred embodiment, a tie layer (c) on each side of the barrier layer (b) comprises the polymer blend according to the first object of the present invention. The composition of the two tie layers (c) can be the same or different, depending on the chemical nature of the further layers adjacent to said two tie layers. In the preferred embodiment, the tie layers (c) adjacent to PVDC have the same composition.

In a preferred embodiment, the film of the present invention has at least two tie layers (c) directly adhered respectively on said first and second surface of the inner barrier layer (b), said tie layers comprising the polymer blend according to the first object of the present invention.

The thickness of the tie layer (c) may be comprised within the range of 1 to 15 microns, preferably 2 to 12 microns, even more preferably 3 to 9 microns.

The films of the present invention comprise an internal oxygen gas barrier layer (b) comprising polyvinylidene chloride (PVDC).

Preferably, the PVDC resin comprises a thermal stabilizer (i.e., HCl scavenger, e.g., epoxidized soybean oil) and a lubricating processing aid, which, for example, comprises one or more acrylates. The term PVDC includes copolymers of vinylidene chloride and at least one mono-ethylenically unsaturated monomer copolymerizable with vinylidene chloride. The mono-ethylenically unsaturated monomer may be used in a proportion of 2-40 wt. %, preferably 4-35 wt. %, of the resultant PVDC. Examples of the mono-ethylenically unsaturated monomer may include vinyl chloride, vinyl acetate, vinyl propionate, alkyl acrylates, alkyl methacrylates, acrylic acid, methacrylic acid, and acrylonitrile. The vinylidene chloride copolymer can also be a ter-polymer. It is particularly preferred to use a copolymer with vinyl chloride or ($C_1$-$C_8$)-alkyl (meth)acrylate, such as methyl acrylate, ethyl acrylate or methyl methacrylate, as the comonomers. It is also possible to use a blend of different PVDC such as for instance a blend of the copolymer of vinylidene chloride with vinyl chloride with the copolymer of vinylidene chloride with methyl acrylate. Blends of PVDC and polycaprolactone (as those described in patent EP2064056 B1, example 1 to 7) are also possible and particularly useful for respiring food products such as some cheeses.

In such a case, the multilayer heat-shrinkable film, which is object of the present invention, can exhibit an oxygen transmission rate (OTR) ranging from 120 to 450, more preferably from 180 to 450 cc/m2 day atm at 23° C. and 0% relative humidity (ASTM D-3985).

The PVDC may contain suitable additives as known in the art, i.e. stabilisers, antioxidizers, plasticizers, hydrochloric acid scavengers, etc. that may be added for processing reasons or/and to control the gas-barrier properties of the resin. Particularly preferred PVDC is IXAN PV910 supplied by Solvin and SARAN 806 by Dow.

Preferably, the gas barrier layer (b) comprises at least 85% of PVDC, more preferably at least 90%, even more preferably at least 95%. In the most preferred embodiment, the barrier layer (b) consists of PVDC.

The gas barrier layer (b) has typically a thickness from 0.1 to 30 μm, preferably 0.2 to 20 μm, more preferably from 0.5 to 10 μm, even more preferably from 1 to 8 μm.

The films of the present invention are typically high barrier films, showing an OTR (evaluated at 23° C. and 0% R.H. according to ASTM D-3985) below 100 $cm^3$/$m^2$·day·atm and preferably below 80 $cm^3$/$m^2$-day-atm and will be particularly suitable for meat packaging, including fresh red meat and processed meat.

The films according to the second object of the present invention comprise a first outer heat sealable layer (a).

The polymer for the heat-sealable layer (a) is typically selected among ethylene-vinyl acetate copolymers (EVA), homogeneous or heterogeneous linear ethylene-alpha-olefin copolymers, polypropylene copolymers (PP), ethylene-propylene copolymers (EPC), ionomers, and blends of two or more of these resins.

As used herein, the teen "EVA" refers to ethylene and vinyl acetate copolymers. The vinyl acetate monomer unit can be represented by the general formula: [$CH_3COOCH=CH_2$].

EVA is a copolymer formed from ethylene and vinyl acetate monomers wherein the ethylene units are present in a major amount and the vinyl-acetate units are present in a minor amount. The typical amount of vinyl-acetate may range from about 5 to about 20%.

Particularly preferred polymer, for the heat sealable layer (a), are heterogeneous materials as linear low density polyethylene (LLDPE) with a density usually in the range of from about 0.910 g/$cm^3$ to about 0.930 g/$cm^3$, linear medium density polyethylene (LLDPE) with a density usually in the range of from about 0.930 g/$cm^3$ to about 0.945 g/$cm^3$, and very low and ultra low density polyethylene (VLDPE and ULDPE) with a density lower than about 0.915 g/$cm^3$; and homogeneous polymers such as metallocene-catalyzed EXACT™ and EXCEED homogeneous resins obtainable from Exxon, single-site AFFINITY™ resins obtainable from Dow, QUEO by Borealis, TAFMER™ homogeneous ethylene-alpha-olefin copolymer resins obtainable from Mitsui. All these materials generally include co-polymers of ethylene with one or more co-monomers selected from (C4-C10)-alpha-olefin such as butene-1, hexene-1, octene-1, etc., in which the molecules of the copolymers comprise long chains with relatively few side chain branches or cross-linked structures.

These polymers can be advantageously blended in various percentages to tailor the sealing properties of the films depending on their use in packaging, as well known by those skilled in the art.

Blends comprising VLDPE polymers, for example AFFINITY PL 1281G1, AFFINITY PL 1845G or QUEO 1007, AFFINITY PL 1280G by DOW is particularly preferred.

In the most preferred embodiment, the sealing layer consists of a blend of two VLDPE resins.

In general, the preferred resins for the heat sealable layer (a) have a seal initiation temperature lower than 110° C., more preferably a seal initiation temperature lower than 105° C., and yet more preferably a sealing initiation temperature lower than 100° C.

The heat-sealable layer (a) of the film of the present invention can have a typical thickness comprised within the range from 2 to 35 microns, preferably from 3 to 30 microns, more preferably from 4 to 26 microns.

Preferably the percentage by weight of the heat sealable layer (a) into the whole film is in the range of from 5 to 35%, more preferably from 7 to 30%, even more preferably from 10 to 25%.

The films of the present invention further comprise one or more stiff resin layers (d) comprising one or more "stiff" resins selected from the group consisting of polyesters, polyamides and styrene-based polymers and their blends.

As used herein, the term "polyester" refers to homopolymers or copolymers having an ester linkage between monomer units which may be formed, for example, by condensation polymerization reactions between a dicarboxylic acid and a glycol. The dicarboxylic acid may be linear or aliphatic, i.e., oxalic acid, malonic acid, succinic acid, glutaric acid, adipic acid, pimelic acid, suberic acid, azelaic acid, sebacic acid, and the like; or may be aromatic or alkyl substituted aromatic, e.g., various isomers of phthalic acid (i.e., ortho-phthalic acid), such as isophthalic acid (i.e., meta-phthalic acid), and terephthalic acid (i.e., para-phthalic acid), as well as naphthalic acid. Specific examples of alkyl substituted aromatic acids—herein also called aromatic polyesters include the various isomers of dimethylphthalic acid, such as dimethylisophthalic acid, dimethylorthophthalic acid, dimethylterephthalic acid, the various isomers of diethylphthalic acid, such as diethylisophthalic acid, diethylorthophthalic acid, the various isomers of dimethylnaphthalic acid, such as 2,6-dimethylnaphthalic acid and 2,5-dimethylnaphthalic acid, and the various isomers of diethylnaphthalic acid. The dicarboxylic acid can alternatively be 2,5-furandicarboxylic acid (FDCA). The glycols may be straight-chained or branched. Specific examples include ethylene glycol, propylene glycol, trimethylene glycol, 1,4-butane diol, neopentyl glycol and the like. The glycols include modified glycols such as 1,4 cyclohexane dimethanol.

Suitable polyesters include poly(ethylene 2,6-naphtalate), poly (butylene terephtalate), poly(ethylene terephthalate), and copolyesters obtained by reacting one or more dicarboxylic acids with one or more dihydroxy alcohols, such as PETG which is an amorphous co-polyesters of terephthaiic acid with ethylene glycol and 1,4-cyclohexanedimethanol.

Preferably, aromatic polyesters are used.

Particularly preferred polyesters are PETs supplied by Artenius or Ramapet by Indorama or Eastman polyester resins.

The polyester-containing layer(s) can comprise any of the above polyester either alone or in blend. In the preferred embodiment, the polyester layer consists of a single polyester resin, particularly preferred are PETs Ramapet N180 and Ramapet N1 by Indorama or Artenius PET Global by Artenius.

Preferably, the percentage by weight of the polyester(s) into the whole film is at least 3%, 4%, 5%, 6%, 7%.

Preferably, the percentage by weight of the polyester(s) into the whole film is in the range of from 3 to 50%, more preferably from 4 to 40%, even more preferably from 5 to 30%.

The polyester can be contained in one or more layers of the film.

The polyester-containing layer can be positioned as inner layer or as outermost layer of the film according to the first object of the present invention.

In a preferred embodiment, the polyester resin is present in a single layer of the films of the present invention.

In a most preferred embodiment, the polyester containing layer is the outermost layer of the film. In a most preferred embodiment, the polyester is present in a single layer, which is the outermost layer of the film.

Preferably the percentage by weight of the polyester(s) in each polyester containing layer is higher than 50%, 70%, 90%, 95%, more preferably higher than 98%, most preferably it substantially consists of polyester(s).

The polyester-comprising layer(s) may have a typical thickness of at least 1.5, at least 2.5, at least 3, at least 4, at least 4.5, at least 5 microns.

The polyester-comprising layer(s) may have a typical thickness from 1.5 to 35 microns, preferably from 2.5 to 30 microns, more preferably from 3 to 25 microns.

The films of the present invention may comprise polyamide layers comprising polyamide homo- and/or copolymers.

Useful polyamide homopolymers include nylon 6 (polycaprolactam), nylon 11 (polyundecanolactam), nylon 12 (polylauryllactam), and the like. Other useful polyamide homopolymers also include nylon 4,2 (polytetramethylene ethylenediamide), nylon 4,6 (polytetramethylene adipamide), nylon 6,6 (polyhexamethylene adipamide), nylon 6,9 (polyhexamethylene azelamide), nylon 6,10 (polyhexamethylene sebacamide), nylon 6,12 (polyhexamethylene dodecanediamide), nylon 7,7 (polyheptamethylene pimelamide), nylon 8,8 (polyoctamethylene suberamide), nylon 9,9 (polynonamethylene azelamide), nylon 10,9 (polydecamethylene azelamide), nylon 12,12 (polydodecamethylene dodecanediamide), and the like. Useful polyamide copolymers include nylon 6,6/6 copolymer (polyhexamethylene adipamide/caprolactam copolymer), nylon 6/6,6 copolymer (polycaprolactam/hexamethylene adipamide copolymer), nylon 6,2/6,2 copolymer (polyhexamethylene ethylenediamide/hexamethylene ethylenediamide copolymer), nylon 6,6/6,9/6 copolymer (polyhexamethylene adipamide/hexamethylene azelaiamide/caprolactam copolymer), as well as other suitable nylons. Additional polyamides include nylon 4, I, nylon 6, I, nylon 6,6/6I copolymer, nylon 6,6/6T copolymer, MXD6 (poly-m-xylylene adipamide), nylon 6T/6I copolymer, nylon 6/MXDT/I copolymer, nylon MXDI, poly-p-xylylene adipamide, polyhexamethylene terephthalamide, polydodecamethylene terephthalamide and the like.

Particularly preferred polyamides are ULTRAMID C33 L 01 supplied by BASF (PA6/66), Terpalex (PA6/66/12), Ube 503X family grades by Ube (PA6/66), and Grilon and Grivory by EMS (PA6I/6T).

Even more preferably, polyamide layer(s) consists of a blend of an aliphatic with an aromatic polyamide, even more preferably a blend of PA6/66 (Poly-caprolactam/hexamethylenediamine/adipic acid) with PA 6I/6T (Poly-hexamethylenediamine/isophthalic acid/terephthalic acid). Preferably, the content of the aliphatic polyamide is between 70% and 97%, more preferably between 85% and 95%, and the content of the aromatic polyamide is between 3% and 30%, more preferably between 5% and 15%. Preferably, the percentage by weight of polyamide(s) in polyamide-containing layer is higher than 50%, 70%, 90%, 95%, more preferably higher than 98%, most preferably the layer consists of polyamide(s).

Polyamide-containing layer typically has a thickness from 1 to 35 µm, preferably 2 to 30 µm, more preferably from 5 to 25 µm, even more preferably from 7 to 20 µm.

Preferably, the percentage by weight of the polyamide(s) into the whole film is at least 20%, 30%, 35%, 40%.

Preferably, the percentage by weight of the polyamide(s) into the whole film is in the range of from 5% to 55%, more preferably from 10% to 50%, even more preferably from 15% to 47%.

The films of the present invention may comprise one or more layers comprising styrene-based polymers.

As used herein, the phrase "styrene-based polymer" refers to at least one polymer selected from the group consisting of polystyrene, styrene-ethylene-butylene-styrene copolymer, styrene-butadiene-styrene copolymer, styrene-isoprene-styrene copolymer, styrene-ethylene-butadiene-styrene copolymer, and styrene-(ethylene-propylene rubber)-styrene copolymer. As used herein the use of a "dash" (i.e., the "-") in a styrene-based polymer formula, is inclusive of both block copolymers and random copolymers. More particularly, the phrase "styrene-based polymer" includes both copolymers in which (i) all named monomers are present as a block, or (ii) any subset of the named monomers are present as a block with the remaining monomers being randomly arranged, or (iii) all named monomers are randomly arranged.

The term "polystyrene" as used herein refers to film grade homopolymers and copolymers of styrene and its analogs and homologs, including -methyl-styrene and ring-substituted styrenes, such as for instance ring-methylated styrenes. This term "polystyrene polymer" is used to identify single polymers or blends of different polystyrene polymers as indicated above.

Particularly preferred polystyrene resins are Styrolux 684D by BASF and Polystyrol 143E by BASF or "K resin KR53" by "Chevron Phillips Chemicals" which can be used either alone or in blend.

The styrene-based polymer layer can be an inner layer or the outermost layer of the film according to the first object of the present invention. Preferably, said layer is an inner layer.

The styrene-based polymer layer typically has a thickness from 1 to 30 µm, preferably 2 to 25 µm, more preferably from 3 to 20 µm.

Each one of the above mentioned stiff resin layers (d) containing stiff resins can also be adhered to the sealant layer (a) by means of tie layers (c).

In the preferred embodiment, at least one of the polyamide containing layers is adhered to the sealant layer (a) by using the tie layer (c) comprising the blend according to the first object of the present invention. The Applicant has surprisingly found that such blend is very effective to provide adhesion between the polyamide-containing layer and the sealant one (a), thus providing abuse resistant heat shrinkable films showing very good performance at converting, as demonstrated in the experimental part of the present description.

In a preferred embodiment, the films of the present invention comprise at least two polyamide-containing layers.

In a most preferred embodiment, the films of the present invention comprise at least two polyamide-containing layers, having identical or different composition, one of them being adhered to the sealant layer (a) and to the PVDC layer (b) respectively by means of tie layers (c) comprising the blend according to the first object of the present invention.

Preferably, the films according to the second object of the present invention comprise two polyamide-containing layers, having identical or different composition, and at least one polyester-containing layers, which is preferably the second outer layer of the film.

In the most preferred embodiment, the two polyamide-containing layers have an identical composition.

The sum of the percentage by weight of the polyamide(s)-containing layer(s) and of the polyester(s)-containing layer(s) in the whole film is preferably at least 20%, more preferably at least 30%, at least 40%, preferably at most 65%, more preferably at most 60%, even more preferably between 40% and 55%.

In one embodiment, said sum is between 30% and 60%, preferably between 35% and 60%, even more preferably between 40% and 55%.

In a most preferred embodiment, the two polyamide-containing layers both consist of a blend of an aliphatic with an aromatic polyamide, even more preferably they both consists of the same blend, most preferably a blend of PA6/66 (Poly-caprolactam/hexamethylenediamine/adipic acid) with PA 6I/6T (Poly-hexamethylenediamine/isophthalic acid/terephthalic acid). Preferably, the content of the aliphatic polyamide is between 70% and 97%, more preferably between 80% and 95%, and the content of the aromatic polyamide is between 3% and 30%, more preferably between 5% and 20%.

The films of the present invention can further comprise one or more additional layer(s) (e) comprising acrylate-based resin, ethylene-vinyl acetate (EVA) or polyolefins, which can also be modified resins as above defined. The additional layer(s) (e) can be inner layer(s) or the outer most layer of the film, depending on the position assigned to the stiff resins-containing layers. Preferably, one or more of said layers are positioned in the structure in such a way to insulate the gas-barrier PVDC layer (b) from those stiff layers (d) made of resins with high melting points, especially from the polyester-containing layer(s). The presence of one or more of said insulating layers (e), preferably as thick layers, surrounding the thermally unstable gas-barrier PVDC layer (b) and insulating it from the high melting layers has been found advantageous in the coextrusion of said layers without incurring in PVDC layer (c) degradation.

Preferably, the additional layers (e) may have a thickness higher than 2, 3, 4 microns.

Such additional layers (e) can have a thickness between 2 to 30 microns, preferably between 3 and 20 microns, even more preferably between 3 and 15 microns.

Even more advantageously, as better explained below, the gas barrier PVDC layer (b) is extruded separately from the highest melting resins of the structure—especially the aromatic polyesters—as the structure is split into a substrate, comprising the barrier PVDC layer (b) preferably further protected by additional layers (e), and a coating, comprising the polyamide-containing layer(s) or the polyester-containing layer (d), the polyester layer being preferably the outermost layer. Useful polymers for the additional insulating layer(s) (e) are acrylate-based polymers, ethylene-vinyl acetate (EVA) or polyolefins, which can also be modified resins as above defined.

As used herein, the phrase "acrylate-based resin" refers to homopolymers, copolymers, including e.g. bipolymers, terpolymers, etc., having an acrylate moiety in at least one of the repeating units forming the backbone of the polymer. In general, acrylate-based resins are also known as polyalkyl acrylates. Acrylate resins or polyalkyl acrylates may be prepared by any method known to those skilled in the art. Suitable examples of these resins for use in the present invention include ethylene/methacrylate copolymers (EMA), ethylene/butyl acrylate copolymers (EBA), ethylene/methacrylic Acid (EMAA), ethylene/methyl methacrylate (EMMA), ionomers and the like. Such as LOTRYL 18 MA 002 by Arkema (EMA), Elvaloy AC 3117 by Du Pont (EBA), Nucrel 1202HC by Du Pont (EMAA), Surlyn 1061 by Du Pont (Ionorner).

As used herein, the term "EVA" refers to ethylene and vinyl acetate copolymers. EVA is a copolymer formed from ethylene and vinyl acetate monomers wherein the ethylene units are present in a major amount and the vinyl-acetate units are present in a minor amount. The typical amount of vinyl-acetate may range from about 5 to about 20%. Examples are Escorene FL0014 by Exxon, ELVAX 3165 by Du Pont, EVA 1003 VN4 by Total. Such EVA can also be a modified EVA, for example BYNEL 3101 or BYNEL 39E660 by DuPont and in such a case, the EVA layer is used as inner layer with a double function of insulation and adhesion promoting layer.

Useful "polyolefin" for the composition of the additional layer (e) are ethylene homo-polymers and ethylene copolymers, and more preferred are ethylene-alpha-olefin copolymers, particularly those with a density of from about 0.895 to about 0.925 g/cm$^3$, and more preferably of from about 0.900 and about 0.920 g/cm$^3$ and their blends.

Particularly preferred ethylene polymers are Affinity or Attane supplied by Dow, Exceed by Exxon and Exact by Dex. ADMER NF 538E by Mitsui Chemical, which is a modified resin, can also be used and in such a case, the layer is used as inner layer with a double function of insulation and adhesion promoting layer.

In one embodiment of the present invention the composition for the additional layer(s) (e) is the blend according to the first object of the present invention.

Among the polyolefins, "polypropylene" (PP) homopolymers or copolymer are particularly preferred.

PP homopolymers refer to polymers of propylene having a density higher than 0.890 g/cm$^3$, preferably higher than 0.895 g/cm$^3$ and/or a melt flow index MFI from 0.5 to 15 g/10 min (at 230° C. and 2.16 kg), preferably from 1.0 to 10 g/10 min, more preferably from 2.5 to 7.0 g/10 min.

PP copolymers refer to random copolymers of propylene with ethylene or butene, having an ethylene or butene content not higher than 15%, preferably not higher than 10%, and having a density higher than 0.890 g/cm$^3$, preferably higher than 0.895 g/cm$^3$ and/or a melt flow index MFI from 0.5 to 15 g/10 min (at 230° C. and 2.16 kg), preferably from 1.0 to 10 g/10 min, more preferably from 2.5 to 7.0 g/10 min; random terpolymers of propylene with ethylene and butene, in which the total amount of ethylene and butene comonomers is not higher than 18%, preferably not higher than 14% and/or the butene/ethylene ratio is higher than 2, preferably higher than 4, having a density higher than 0.890 g/cm$^3$, preferably higher than 0.895 g/cm$^3$ and/or a melt flow index MFI from 0.5 to 15 g/10 min (at 230° C. and 2.16 kg), preferably from 1.0 to 10 g/10 min, more preferably from 2.5 to 7.0 g/10 min.

Particularly preferred propylene polymers are ELTEX PKS 607 by Solvay, ELTEX PKS359 or PKS350 by Ineos and and Moplen HP515M di Lyondell Basell.

Additional tie layers, well known in the art, can be added to improve interlayer adhesion.

In all the film layers, the polymer components may contain appropriate amounts of additives normally included in such compositions. Some of these additives are preferably included in the outer layers or in one of the outer layers, while some others are preferably added to inner layers. These additives include slip and anti-block agents such as talc, waxes, silica, and the like, antioxidants, stabilizers, plasticizers, fillers, pigments and dyes, cross-linking inhibitors, cross-linking enhancers, UV absorbers, odour absorbers, oxygen scavengers, antistatic agents, anti-fog agents or compositions, and the like additives known to those skilled in the art of packaging films.

An exemplary, non-exhaustive layers sequence of the films of the present inventions is the following:

a/c/d/c/b/c/e/d/e/d wherein when the same letter is written more than once in a sequence, those letters can represent layers having identical or different chemical composition.

A preferred film according to the invention has the following sequence of layers:

a/c/d/c/b/c/e/d/e/d wherein
layer a) is the first outer heat sealable layer,
layer b) is the inner barrier layer comprising polyvinylidene chloride (PVDC),
layers c) are tie layers comprising the polymer blend according to the first object of the invention,
internal layers d) are stiff resin layers comprising polyamide(s),
outer layer d) is the second outer layer comprising polyester(s), and
layers e) are additional layers comprising modified ethylene-vinyl acetate (EVA).

The films according to the present invention are biaxially oriented and heat-shrinkable. In such a case, they show a % free shrink in each direction of at least 10% at 85° C. (according to ASTM D2732), preferably at least 15%, even more preferably of at least 20% at 85° C. and they show a total free shrink at 85° C. of at least 40%, preferably at least 50%, even more preferably at least 60%.

The films of the present invention show very good processability, especially in terms of bubble stability and quality and in terms of uniform thickness distribution and planarity. In addition, when oriented, such films are able to withstand high orientation ratios in both the directions, such as orientation ratios between about 2 and about 6 in each direction, preferably between about 3 and about 5 in each direction, even more preferably between 3.1 and 4.5 in each direction. Additionally, the films of the present invention can be printed by anyone of the printing methods known in the art.

A third object of the present invention is a process for the manufacture of a film according to the second object of the present invention.

The multilayer asymmetric heat-shrinkable film according to the first object of the present invention can be manufactured by co-extrusion, preferably by extrusion coating as described in U.S. Pat. No. 3,891,008, using either a flat or a circular film die that allows shaping the polymer melt into a thin film or tube.

Preferably, the films according to the present invention can be manufactured by the so-called trapped-bubble process, which is a known process typically used for the manufacture of heat-shrinkable films for food contact packaging. According to said process, the multilayer film is coextruded preferably through a round die, to obtain a tube of molten polymeric material which is quenched immediately after extrusion without being expanded, then heated to a temperature which is above the Tg of all the resins employed and below the melting temperature of at least one of the resins employed, typically by passing it through a hot water bath, or alternatively by passing it through an IR oven or a hot air tunnel, and expanded, still at this temperature by internal air pressure, to get the transversal orientation, and by a differential speed of the pinch rolls which hold the thus obtained "trapped bubble", to provide the longitudinal orientation.

Typical orientation ratios for the films of the present invention can be comprised between about 2 and about 6 in each direction, preferably between about 3 and about 5 in each direction, even more preferably between 3.1 and 4.5 in each direction. After having been stretched, the film is quickly cooled while substantially retaining its stretched dimensions to somehow freeze the molecules of the film in their oriented state and rolled for further processing.

Alternatively, the film according to the present invention may be obtained by flat extrusion (co-extrusion or extrusion coating) and biaxial stretching by a simultaneous or a sequential tenterframe process.

In a preferred embodiment, the films according to the first object of the present invention are manufactured by the so called trapped-bubble process. Extrusion coating manufacturing method is particularly preferred.

At least a portion of the multilayer film of the present invention can optionally be irradiated to induce crosslinking, thus improving the mechanical properties of the films and allowing an easier orientation step.

In the irradiation process, the film is subjected to one or more energetic radiation treatments, such as corona discharge, plasma, flame, ultraviolet, X-ray, gamma ray, beta ray, and high energy electron treatment, each of which induces cross-linking between molecules of the irradiated material. The irradiation of polymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for crosslinking the polymer present in the film.

To produce crosslinking, a suitable radiation dosage of high-energy electrons is employed, preferably using an electron accelerator, with a dosage level being determined by standard dosimetry methods. Other accelerators such as a Van de Graaf or resonating transformer may be used. The radiation is not limited to electrons from an accelerator since any ionizing radiation may be used. The ionizing radiation can be used to crosslink the polymers in the film. Preferably, the film is irradiated at a level of from about 30 kGy (kiloGrays) to about 207 kGy, more preferably from about 30 kGy to about 140 kGy. As can be seen from the descriptions of preferred films for use in the present invention, the most preferred amount of radiation is dependent upon the film and its end use.

If desired, the film may be cross-linked, either chemically or, preferably, by irradiation. Typically to produce cross-linking, an extrudate is treated with a suitable radiation dosage of high-energy electrons, preferably using an electron accelerator, with the dosage level being determined by standard dosimetry methods. Depending on the characteristics desired, this irradiation dosage can vary from about 20 to about 200 kGy, preferably from about 30 to about 150 kGy.

Other accelerators such as a Van der Graff generator or resonating transformer may be used.

The radiation is not limited to electrons from an accelerator since any ionizing radiation may be used.

Depending on the number and chemical nature of the layers in the structure it may be preferable to split the co-extrusion step: a "substrate" tube will first be formed, with the heat sealable layer (a) on the inside of the tube, preferably comprising the gas-barrier PVDC layer (b) and, optionally, at least one stiff resin layer (d) preferably containing the polyamide or polyester resins, even more preferably polyamide resin(s).

A tie layer (c) and/or an additional layer (e) can be interposed between said layer and the gas-barrier PVDC layer (b). This tube will be quenched quickly and before submitting it to the orientation step it will be extrusion-coated with the remaining layers ("coating"), again quickly quenched, optionally cross-linked, and then passed to the orientation. During extrusion-coating the tube will be slightly inflated just to keep it in the form of a tube and avoid that it collapses.

The coating step can be simultaneous, by coextruding all the remaining layers altogether, so as to simultaneously adhere all of them, one over the other, to the quenched tube obtained in the first coextrusion step, or this coating step can be repeated as many times as the layers which are to be added.

The Applicant found out that it is particularly advantageous to keep the thermally unstable PVDC layer (b) in the substrate separated from the highest melting resins, if any, by interposition of insulating layers (e) and/or by placing most of the high melting resins e.g. the polyesters, in the coating structure, thus processing the substrate under lower temperatures and minimizing heat exchange between the layers.

Surprisingly, notwithstanding the asymmetric distribution of the highest melting, more stiff resins within the structure and their high content, the curling of the present films was generally very low or absent. In addition, by using the blend according to the first object of the present invention, it was possible to obtain good adhesion, even after shrink, between the barrier layer and the remaining layers of the structure and in some embodiments between the polyamide layer and the sealant one. Furthermore, the films according to the present invention have good processability.

The extrusion-coating step is clearly also required when a film only partially cross-linked is desired. As the gas-barrier PVDC layer (b) might be degraded/discoloured by irradiation, it might be desirable to avoid cross-linking of the PVDC layer. In this case the irradiation step may be performed on the coating, which would not comprise the PVDC barrier layer (b), and before extrusion coating.

In the preferred embodiment, the films according to the first object of the present invention are manufactured by extrusion coating through a round die followed by trapped bubble orientation. In one embodiment, the films according to the first object of the present invention are irradiated. In another embodiment, the films according to the first object of the present invention are not irradiated.

Preferably, the process, for manufacturing the film according to the second object of the present invention, comprises the steps of:
  co-extruding, through a round die, a tubular substrate comprising at least
  a first outer heat sealable layer (a),
  an inner barrier layer (b) comprising polyvinylidene chloride (PVDC) said layer having a first surface and a second surface;
  at least one tie layer (c) being positioned on the first surface or on the second surface of the inner barrier layer, wherein said tie layer (c) comprises, preferably consists of, the polymer blend according to the first object of the present invention;
  quenching such a tubular substrate at temperatures between 5 and 15° C., preferably between 7° C. and 10° C., after extrusion;
  extrusion-coating the substrate with all the remaining layers, thus obtaining an unoriented tubular film;
  quenching such unoriented tubular film at temperatures between 5° C. and 30° C., preferably between 8° C. and 25° C.;
  heating the tubular film to a temperature which is above the Tg of all the polymeric resins composing the layers and below the melting temperature of at least one of the resins employed,
  biaxially orienting the tubular film at orientation ratios from about 2 to about 6 in each direction, preferably between about 3 and about 5 in each direction, even more preferably between 3.1 and 4.5 in each direction
  quenching the oriented tubular film, preferably in cold air, at a temperature from 4 to 30° C., preferably from 5 to 10° C.

Another preferred process for manufacturing the film according to the second object of the present invention, comprises the steps of:
  coextruding, through a flat die, a flat substrate comprising at least
  a first outer heat sealable layer (a),
  an inner barrier layer (b) comprising polyvinylidene chloride (PVDC) said layer having a first surface and a second surface;
  at least one tie layer (c) being positioned on the first surface or on the second surface of the inner barrier layer, wherein said tie layer (c) comprises, preferably consists of, the polymer blend according to the first object of the present invention;
  quenching such substrate at temperatures between 5-15° C., preferably at 8-10° C., after extrusion;
  extrusion-coating the substrate with all the remaining layers, thus obtaining an un-oriented flat tape;
  quenching such un-oriented tape at temperatures between 5° C. and 30° C., preferably between 20 and 30° C.;
  heating the tape to a temperature which is above the Tg of all the polymeric resins composing the layers and below the melting temperature of at least one of the resins employed;
  biaxially orienting the tape a by tenterframe, sequentially or simultaneously, preferably simultaneously, at orientation ratios from about 2 to about 6, preferably between 3 and 5, even more preferably between 3.1 and 4.5 in each one of longitudinal and transverse directions, and quenching the oriented film, preferably in cold air, at a temperature from 4° C. to 30° C., preferably from 5° C. to 10° C.

The coextrusion of the substrate, is generally performed at temperatures lower than 250° C., 240° C., 230° C., 200° C., 180° C.

Preferably, the coextrusion of the substrate, is performed at temperatures from 160 to 240° C., preferably from 170 to 230° C.

The coating step can be simultaneous, by coextruding all the remaining layers altogether, so as to simultaneously adhere all of them, one over the other, to the quenched tube obtained in the first coextrusion step, or the coating step can be repeated as many times as the number of layers which are to be added.

The coating of the substrate is generally effected by heating the resins of the coating at temperatures higher than 200° C., 230° C., 250° C., up to 280° C., typically from 200° C. to 270° C.

The optionally cross-linked tape or tube is then biaxially oriented.

The orientation heating temperature of the tube or of the tape generally ranges for instance from 70 to 98° C. depending on several factors such as the nature and amount of each resin within the tube, the thickness of the tube, the orientation ratios to be achieved as known to the skilled in the art.

After having been stretched, the film is quickly cooled, preferably by cold air, at temperature between 4 e 30° C., preferably between 5-10° C., while substantially retaining its stretched dimensions to somehow freeze the molecules of the film in their oriented state and rolled for further processing.

In a preferred embodiment, the films according to the first object of the present invention are manufactured by extrusion coating followed by orientation.

In a preferred embodiment, the films according to the first object of the present invention are manufactured by round die extrusion-coating followed by trapped-bubble orientation.

Alternatively, the film according to the present invention may be obtained by flat extrusion coating and biaxial stretching by a simultaneous or a sequential tenterframe process.

The present manufacturing method includes the preparation of a first substrate by co-extrusion of some of the structure layers—at least the first outer heat sealable layer (a), the inner PVDC barrier layer (b) and at least one tie layer (c)—and the subsequent deposition thereon of a coating comprising, at least, the polyester layer (d) and optionally the remaining layers, Preferably, the process for manufacturing the film according to the present invention, comprises the steps of:

co-extruding, at a temperature lower than 250° C., 240° C., 230° C., 200° C., 180° C. through a round die, a tubular substrate comprising at least a first outer heat sealable layer (a), an inner barrier layer (b) comprising polyvinylidene chloride (PVDC) said layer having a first surface and a second surface;

at least one tie layer (c) being positioned on the first surface or on the second surface of the inner barrier layer, (b) wherein said tie layer (c) comprises, preferably consists of, the polymer blend according to the first object of the present invention;

quenching such a tubular substrate at temperatures between 5 and 15° C., preferably between 7° C. and 10° C., after extrusion;

extrusion-coating the substrate with all the remaining layers, wherein the layer corresponding in the final film to the second outer layer (d) comprises polyester(s), at a temperature higher than 200° C., 220° C., 230° C., 240° C., 250° C. thus obtaining an unoriented tubular film;

quenching such unoriented tubular film at temperatures between 5° C. and 30° C., preferably between 8° C. and 25° C.;

heating the tubular film to a temperature which is above the Tg of all the polymeric resins composing the layers and below the melting temperature of at least one of the resins employed, biaxially orienting the tubular film at orientation ratios from about 2 to about 6 in each direction, preferably between about 3 and about 5 in each direction, even more preferably between 3.1 and 4.5 in each direction quenching the oriented tubular film, preferably in cold air, at a temperature from 4 to 30° C., preferably from 5 to 10° C.

In a preferred embodiment, the substrate comprises at least a layer containing a "stiff" resin (d) as herein defined, preferably the polyamide-containing layer, and the coating applied onto the substrate comprises at least another layer containing a "stiff" resin (d) comprising one or more polyester. Preferably, the polyester-containing layer is the second outer layer of the film. Preferably, the substrate comprises at least a polyamide-containing layer, and the coating applied onto the substrate comprises at least a layer comprising one or more polyester, which is preferably the second outer one, and a second polyimide-containing layer.

It was found that this combination of process and layer configuration is particularly advantageous to preserve the integrity of the barrier PVDC resins and to impart high abuse resistance and excellent shrinking properties to the films, without curling.

The films of the present invention show very good processability and are able to withstand high orientation ratios. For instance, orientation ratios for the films of the present invention can be comprised between about 2 and about 6 in each direction, preferably between about 3 and about 5 in each direction, even more preferably between 3.1 and 4.5 in each direction.

A fourth object of the present invention is an article for packaging in the form of a seamless tube wherein the heat-sealing layer is the innermost layer of the tube or in the form of a flexible container such as a pouch or a bag obtainable by heat-sealing to itself a film according to the second object. The article in the form of a seamless tube can be manufactured by extrusion or extrusion coating through a round die of the layers of the present films as previously defined, followed by, optional irradiation and by trapped bubble orientation, as described above.

The resulting seamless tube can be directly processed to furnish flexible packaging containers or, in alternative, can be converted into a flat film by slitting before being winded into rolls or being further re-processed. The self-sealing of the film according to the present invention can be accomplished in a fin seal and/or lap seal mode, preferably by having the heat sealable layer heat sealed to itself, i.e. in a fin seal mode.

The heat-shrinkable flexible containers can be in the form of an end-seal bag (ES), a side (or transverse TS) seal bag or a pouch.

In one embodiment, the flexible container is a lay-flat, end-seal bag made from a seamless tubing, the end-seal bag having an open top, first and second foldedside edges, and an end seal across a bottom of the bag.

In one embodiment, the flexible container is a lay-flat, side-seal bag made from a seamless tubing, the side-seal bag having an open top, a folded bottom edge, and first and second side seals.

In one embodiment, the flexible container is a lay-flat, V-shaped side-seal bag made from a seamless tubing, the side-seal bag having an open top, a folded bottom edge, and first and second side seals. Said first and second side seals can be completely angled with respect to the open top, thus providing a triangular or almost triangular bag or, preferably, can be partially straight (i.e. perpendicular to the open top) and partially angled, conferring a more trapezium-like shape.

In one embodiment, the flexible container is a lay-flat pouch made by heat sealing two flat films to one another, the pouch having an open top, a first side seal, a second side seal and a bottom seal. The flexible container optionally comprises at least one tear initiator.

The films of the present invention can be supplied in rolls and formed as pouches on conventional horizontal machine such as for example Flow Wrapper (HFFS) supplied by ULMA. In this kind of packaging machine, the product is packaged in a pouch shrunk around the product and having three-seals: two transversal seals and one longitudinal seal.

Pouches can also be formed just before being filled, for example according to Vertical Form Fill Seal (VFFS) packaging systems. The VFFS process is known to those skilled in the art and described for example in U.S. Pat. No. 4,589,247. The product is introduced through a central, vertical fill tube to a formed tubular film having been sealed longitudinally and transversely at its lower end. The pouch is then completed by sealing the upper end of the tubular segment, and severing the pouch from the tubular film above it.

Other bag and pouch making methods known in the art may be readily adapted to make receptacles or containers from the multilayer film according to the present invention.

A fifth object of the present invention is a package comprising an article according to the third object and a product packaged in said article.

In packaging, the product will be loaded into a preferably heat-shrinkable bag made of the film of the invention, the bag will normally be evacuated, and the open end thereof will be closed by heat-sealing or by applying a clip, e.g. of metal. This process is advantageously carried out within a vacuum chamber where the evacuation and application of the clip or heat seal is done automatically. After the bag is removed from the chamber it is heat shrunk by applying heat. This can be done, for instance, by immersing the filled bag into a hot water bath or conveying it through a hot water shower or a hot air tunnel, or by infrared radiation. The heat treatment will produce a tight wrapping that will closely conform to the contour of the product therein packaged.

A common method of packaging food and non-food products is by means of pouches made on form-fill-seal machines, such as a Horizontal Form-Fill-Seal (HFFS) or a Vertical Form-Fill Seal (VFFS) machine.

A FFS machine, either Horizontal or Vertical, typically includes a former, for forming a flat web of film into a tubular configuration, a longitudinal sealer, to seal the overlapped longitudinal edges of the film in the tubular configuration, a conveyor, for feeding the products into the tubular film one after the other in suitably spaced configuration, or a feeding tube in case of a VFFS machine, and a transverse sealer, for sealing the tubular film in a cross-wise direction to separate the products into discrete packages.

The transverse sealer may be operated to simultaneously seal the bottom of the leading pouch and the front of the following pouch and sever the two seals as well as the leading package from the front sealed tubing.

Alternatively, in the HFFS process, the transverse seal may be operated to sever the leading package from the following tubular portion and sealing the front of said tubular portion thus creating the sealed bottom of the next leading pouch. In this way the leading pouch containing the product to be packaged has a longitudinal seal and only one transverse seal. It can then be vacuumized before a second transverse seal hermetically closes it. Also in this case, the preferably oriented heat-shrinkable thermoplastic film of the present invention is employed as the packaging material and the vacuumized package is then shrunk to achieve the desired presentation/appearance.

In the FFS processes, while the transverse seals are always fin seals, the longitudinal seal can be either a fin seal or a lap seal, i.e. a seal where the inner most heat sealable layer of the film is sealed to the outermost layer of the same film.

The polymers used for the thermoplastic packaging material and in particular for the heat sealing layer (a) are selected in such a way to provide high seal strengths. This in fact guarantees that the final flexible container will suitably protect the packaged product from the outside environment, without accidental openings or leakers.

The outermost or external layer must also be carefully selected for its heat resistance during the sealing step. For example, it is advantageous to select for this layer a polymer having melting point higher than the sealing temperature. Preferably, the outermost layer of the present films is a stiff resin layer (d).

A heat shrinkable bag from a film of the invention has wide applications, preferably for food packaging, particularly for meat, poultry, cheese, processed and smoked meat, pork and lamb. The shrink properties of the film will in fact guarantee relatively complete shrinkage of the bag around the product, so that the bag is not wrinkled, thus offering an attractive package. The bag will have proper abuse resistance in order to survive the process of being filled, evacuated, sealed, closed, heat shrunk, boxed, shipped, unloaded, and stored at the retail supermarket, and a sufficient stiffness to improve also its loading process.

Examples

The present invention can be further understood by reference to the following examples that are merely illustrative and are not to be interpreted as a limitation to the scope of the present invention that is defined by the appended claims.

In the following examples the polymers indicated in Table 1 below have been employed.

TABLE 1

| Tradename/Supplier | Chemical Nature | Acronym | Properties & Parameters |
|---|---|---|---|
| AFFINITY PL 1845G, DOW | Polyethylene, Very Low Density Ethylene/Octene Copolymer-Linear, Single Site; no slip agents | VLDPE1 | Density 0.91 g/cm$^3$ Melt Flow Rate (Cond. 190° C./02.16 kg (E)) 3.5 g/10 min |
| AFFINITY PL 1281G1, DOW | Polyethylene, Very Low Density Ethylene/Octene Copolymer-Linear, Single Site; no slip agents | VLDPE2 | Comonomer content 13%, Density 0.90 g/cm3 Melt Flow Rate (Cond. 190° C./02.16 kg (E)) 6.0 g/10 min, Melting Point 99° C. |
| ADMER NF 538E, Mitsui Chemical | Maleic Anhydride-Modified Polyethylene, Very Low Density | VLDPE-mod | Density 0.91 g/cm$^3$, Melt Flow Rate (Cond. 190° C./02.16 kg (E)) 4.1 g/10 min, Vicat softening point 85° C. |
| OREVAC 18211, Arkema | Maleic Anhydride-Modified Ethylene/Vinyl Acetate Copolymer | EVA-mod1 | Comonomer content 25%, Density 0.95 g/cm$^3$, Melt Flow Rate (Cond. 190° C./02.16 kg (E)) 3.5 g/10 min, Melting Point 72° C. |
| BYNEL 3101, DuPont | Acid/Acrylate Modified Ethylene/Vinyl Acetate Copolymer | EVA-mod2 | Comonomer content 18.4% Density 0.943 g/cm$^3$, Melt Flow Rate (Cond. 190° C./02.16 kg (E)) 3.2 g/10 min, Melting Point 87° C., Vicat softening point 65° C. |
| BYNEL 39E660 DuPont | Maleic Anhydride-Modified Ethylene/Vinyl Acetate Copolymer | EVA-mod3 | Comonomer content 11.8% Density 0.943 g/cm$^3$, Melt Flow Rate (Cond. 190° C./02.16 kg (E)) 2.50 g/10 min, Melting Point 95° C., Vicat softening point 72° C. |
| IXAN PV910, Solvin | Vinylidene Chloride/Methyl Acrylate Copolymer-Stabilized | PVDC-MA | Bulk (Apparent) Density min 0.78 g/cm$^3$, Comonomer content 8.1%, Density 1.71 g/cm$^3$, Viscosity Relative min 1.44-max 1.48, Viscosity Solution 1.46 mPA.sec |
| ULTRAMID C 33 L01, BASF | Polyamide-6/66, Lubricated Poly(caprolactam/hexamethylenediamine/adipic acid) | PA-6/66 | Density 1.12 g/cm$^3$, Melting Point 196° C. |
| Grivory G21 Natural, EMS-Grivory | Polyamide, Amorphous-Poly(hexamethylenediamine/isophthalic acid/terephthalic acid | PA-6I/6T | Density 1.82 g/cm$^3$, Glass transition temperature 125° C., Melt Flow Rate (Cond. 275° C./5 kg) 20 g/10 min |
| RAMAPET N180, Indorama | Polyester, copolymer of terephthalic acid, isophthalic acid and mono-ethylene glycol | PET | Density 1.4 g/cm$^3$, Intrinsic Viscosity 0.80 dl/g, Glass transition temperature 78° C., Melting point 245° C. |
| ADMER NF518E Mitsui Chemical | Maleic Anhydride-Modified Polyethylene, Linear Low Density- | LLDPE-mod | Density 0.91 g/cm$^3$, Melt Flow Rate (Cond. 190° C./02.16 kg (E)) 3.1 g/10 min, Melting Point 118° C., Volatile Content: 0.2% |
| ADMER NF911E Mitsui Chemical | Maleic Anhydride-Modified Polyethylene, Linear Low Density | LLDPE-mod1 | Density 0.90 g/cm$^3$, Melt Flow Rate (Cond. 190° C./02.16 kg (E)) 2.5 g/10 min, Vicat softening point 74° C. |

The examples according to the invention were collected in the Table 2.

TABLE 2

| | Examples | | | | |
|---|---|---|---|---|---|
| | Example 1 | Example 2 | Example 3 | Example 4 | Example 5 |
| Total thickness | 95 μm | 80 μm | 74.9 μm | 90 μm | 95 μm |
| Layer 1 heat sealant (a) | 80% VLDPE2 20% VLDPE1 (24.1 μm) | 80% VLDPE2 20% VLDPE1 (20.6 μm) | 80% LDPE2 20% LDPE1 (11.9 μm) | 80% VLDPE2 20% VLDPE1 (25.3 μm) | 80% VLDPE2 20% VLDPE1 (25.3 μm) |
| Layer 2 (c) | 70% VLDPE-mod 30% EVA-mod3 (5.7 μm) | 70% VLDPE-mod 30% EVA-mod3 (5.6 μm) | 70% LLDPE-mod 30% EVA-mod3 (8.5 μm) | 50% VLDPE-mod 50% EVA-mod3 (5.3 μm) | 50% LLDPE-mod1 50% EVA-mod3 (5.3 μm) |
| Layer 3 (d) | 90% PA-6/66 10% PA-6I/6T (19.4 μm) | 90% PA-6/66 10% PA-6I/6T (14 μm) | 90% PA-6/66 10% PA-6I/6T (11.9 μm) | 90% PA-6/66 10% PA-6I/6T (19.5 μm) | 90% PA-6/66 10% PA-6I/6T (19.5 μm) |
| Layer 4 (c) | 70% VLDPE-mod 30% EVA-mod3 (4.7 μm) | 70% VLDPE-mod 30% EVA-mod3 (4.7 μm) | 70% LLDPE-mod 30% EVA-mod3 (5.1 μm) | 50% VLDPE-mod 50% EVA-mod3 (4.2 μm) | 50% LLDPE-mod1 50% EVA-mod3 (4.2 μm) |
| Layer 5 (b) | 100% PVDC-MA (4.7 μm) | 100% PVDC-MA (4.7 μm) | 100% PVDC-MA (4.7 μm) | 100% PVDC-MA (4.8 μm) | 100% PVDC-MA (4.8 μm) |
| Layer 6 (c) | 70% VLDPE-mod 30% EVA-mod3 (3.3 μm) | 70% VLDPE-mod 30% EVA-mod3 (3.3 μm) | 70% LLDPE-mod 30% EVA-mod3 (3.4 μm) | 50% VLDPE-mod 50% EVA-mod3 (2.6 μm) | 50% LLDPE-mod1 50% EVA-mod3 (2.6 μm) |
| Layer 7 (e) | 100% EVA-mod2 (4.3 μm) | 100% EVA-mod2 (4.2 μm) | 100% EVA-mod2 (4.3 μm) | 100% EVA-mod2 (3.7 μm) | 100% EVA-mod2 (3.7 μm) |
| Layer 8 (d) | 90% PA-6/66 10% PA-6I/6T (19.4 μm) | 90% PA-6/66 10% PA-6I/6T (14 μm) | 90% PA-6/66 10% PA-6I/6T (11.9 μm) | 90% PA-6/66 10% PA-6I/6T (20.1 μm) | 90% PA-6/66 10% PA-6I/6T (20.1 μm) |
| Layer 9 (e) | 100% EVA-mod2 (4.7 μm) | 100% EVA-mod2 (4.7 μm) | 100% EVA-mod2 (4.7 μm) | 100% EVA-mod2 (4.2 μm) | 100% EVA-mod2 (4.2 μm) |
| Layer 10 (d) | 100% PET (4.7 μm) | 100% PET (4.2 μm) | 100% PET (8.5 μm) | 100% PET (5.3 μm) | 100% PET (5.3 μm) |
| Polyester(s)[1] | 6.5 | 7 | 14.6 | 7.3 | 7.3 |
| Polyamide(s)[1] | 43 | 37 | 32.9 | 43.9 | 43.9 |
| Sealant layer[1] | 21.5 | 21.9 | 13.1 | 22.5 | 22.5 |

[1]percentage by weight

The comparative examples have been collected in the Table 2a.

TABLE 2a

| | Examples | | |
|---|---|---|---|
| | Comparative 1 | Comparative 2 | Comparative 3 |
| Total thickness | 90 μm | 74.9 μm | 89.9 μm |
| Layer 1 heat sealant (a) | 80% VLDPE2 20% VLDPE1 (13.8 μm) | 80% VLDPE2 20% VLDPE1 (11.9 μm) | 80% VLDPE2 20% VLDPE1 (12.5 μm) |
| Layer 2 (c) | 70% EVA-mod1 30% VLDPE-mod (8.7 μm) | 70% EVA-mod1 30% VLDPE-mod (8.5 μm) | 100% EVA-mod2 (6.5 μm) |
| Layer 3 (d) | 90% PA-6/66 10% PA-6I/6T (17.7 μm) | 90% PA-6/66 10% PA-6I/6T (11.9 μm) | 80% PA-6/66 20% PA-6I/6T (17.7 μm) |
| Layer 4 (c) | 70% EVA-mod1 30% VLDPE-mod (5.2 μm) | 70% EVA-mod1 30% VLDPE-mod (5.1 μm) | 100% EVA-mod2 (4.8 μm) |
| Layer 5 (b) | 100% PVDC-MA (4.8 μm) | 100% PVDC-MA (4.7 μm) | 100% PVDC-MA (4.8 μm) |
| Layer 6 (c) | 70% EVA-mod1 30% VLDPE-mod (3.5 μm) | 70% EVA-mod1 30% VLDPE-mod (3.4 μm) | 100% EVA-mod2 (5.6 μm) |
| Layer 7 (e) | 100% EVA-mod2 (4.3 μm) | 100% EVA-mod2 (4.3 μm) | 100% EVA-mod2 (5.2 μm) |
| Layer 8 (d) | 90% PA-6/66 10% PA-6I/6T (17.7 μm) | 90% PA-6/66 10% PA-6I/6T (11.9 μm) | 80% PA-6/66 20% PA-6I/6T (17.7 μm) |
| Layer 9 (e) | 100% EVA-mod2 (4.8 μm) | 100% EVA-mod2 (4.7 μm) | 100% EVA-mod2 (5.6 μm) |
| Layer 10 (d) | 100% PET (9.5 μm) | 100% PET (8.5 μm) | 100% PET (9.5 μm) |
| Polyester(s)[1] | 13.5 | 14.5 | 13.5 |
| Polyamide(s)[1] | 40.5 | 32.7 | 40.5 |
| Sealant layer[1] | 12.6 | 13.1 | 11.4 |

[1]percentage by weight

The layers of Table 2 and 2a are reported in their order of extrusion, from the sealing layer indicated as layer 1 to the second outer layer (the latest listed, layer 10).

The multilayer films according to the present invention (Examples 1-5) and the comparative films 1 to 3 have been prepared by extrusion through a round die of a substrate consisting of layer 1 to layer 6.

The extruded multilayer tubular film thus obtained was then
- quenched with a water cascade at 8° C.,
- extrusion coated with layer 7 to layer 10.

During the extrusion of the substrate tubing of the comparative examples, corn starch is added (C300R average particle size 15 microns by Arkem PRS) through a pipe systems by which also the air used to adjust the tube dimension is inserted.

The obtained tube is then rapidly quenched at 10° C. and biaxially oriented by passing it through a hot water bath kept at a temperature of 94° C., then inflating to get transverse orientation and stretching to get longitudinal orientation. The orientation ratios were from about 3.4:1 in the longitudinal direction and 3.1:1 in the transverse direction.

The oriented tubular film was then quenched by cold air at 10° C.

During the manufacturing of the films of the present invention (Examples 1 to 5), very good process stability, in particular a resistance to high draw ratio without negative effect on the optical properties were observed. Additionally, no degradation of the PVDC layer was observed.

The test methods used for properties evaluation are summarized in the following Table 3.

TABLE 3

| Property | Test method |
|---|---|
| Free shrink at 85° C. | ASTM D2732 |
| Haze | ASTM D1003 |
| Gloss 60° | ASTM D2457 |
| Haze after shrink at 85° C. | ASTM D1003 (measurement on sample after shrink at 85° C.) |
| Puncture at 23° C. | Internal method see description below |
| Elastic Modulus at 23° C. | ASTM D882 |
| Tensile Strength and Elongation at break at 23° C. | ASTM D882 |
| Maximum and residual shrink tensions | Internal method see description below |
| Curling Effect | Internal method see description below |
| Parallel Plate | Internal method see description below |

Free Shrink: it is the percent dimensional change in a 10 cm×10 cm specimen of film when subjected to a selected heat; it has been measured following ASTM Standard Test Method D 2732, immersing the specimen for 5 seconds in a heated water bath at 85° C. The results of this test are reported in Table 4 and 4a.

Maximum shrink tension (kg/cm$^2$) and residual cold shrink tension (at 5° C.) (kg/cm$^2$) were measured through an internal method.

The maximum shrink tension is the maximum value of the tension developed by the materials during the heating/shrinking process. Specimens of the films (2.54 cm×14.0 cm, of which 10 cm are free for testing) are cut in the longitudinal (LD) and transverse (TD) directions of the film and clamped between two jaws, one of which is connected to a load cell. The two jaws keep the specimen in the centre of a channel into which an impeller blows heated or cold air and two thermocouples measure the temperature. The thermocouples are positioned as close as possible (less than 3 mm) to the specimen and in the middle of the same. The signals supplied by the thermocouples (which is the testing temperature) and by the load cell (which is the force) are sent to a computer where the software records these signals. The impeller starts blowing hot air and the force released by the sample is recorded in grams. The temperature is increased from 23° C. to 90° C. at a rate of about 3.2° C./second by blowing heated air and then decreased from 90° C. to 5° C. at a rate of 0.9° C./second by blowing cold air. The maximum shrink tension is calculated by dividing the maximum force value in kg (force at peak) by the specimen width (expressed in cm) and by the specimen average thickness (expressed in cm) and is expressed as kg/cm$^2$. The residual cold shrink tension is calculated by dividing the force (in kg) exerted by the specimen at 5° C. and the specimen width (in cm) and the specimen average thickness (in cm) and is expressed as kg/cm$^2$. Three specimens were measured for each film in each direction. The results of this test are reported in Table 4 and 4a.

Tensile Strength and Elongation at Break (ASTM D 882).

Tensile strength represents the maximum tensile load per unit area of the original cross-section of the test specimen required to break it, expressed as kg/cm$^2$.

Elongation at break represents the increase in length of the specimen, measured at the moment of rupture expressed as percentage of the original length. Measurements were performed with Instron tensile tester equipped with a load cell type CM (1-50 kg), in an environmental chamber set at 23° C., on specimens previously stored at 23° C. and 50% RE for minimum of 24 hours. Tensile and elongation measurements were recorded simultaneously and the reported results are the average values. The results of this test are reported in Table 4 and 4a.

Elastic modulus at 23° C.: it has been evaluated following ASTM D 882. The results of this test are reported in Table 4 and 4a.

Haze: it has been evaluated following ASTM D1003. The results of this test are reported in Table 4 and 4a.

Gloss 60°: it has been evaluated following ASTM D2457. The average value of the measurements performed in longitudinal and transversal direction was reported. The results of this test are reported in Table 4 and 4a.

Haze after shrink at 85° C.: at least 3 test specimens for each material were trimmed to a size 15 cm×15 cm, placed in a pair of metal tongs and subjected to shrink process in hot water at 85° C. for 5 seconds and then cooled down in a cold water bath for 5 seconds. The specimens were then let dry, mounted in the sample holder and haze was measured following ASTM D1003, The results of this test are reported in Table 4 and 4a.

Puncture at 23° C.: the puncture resistance is the resistance force arising when pushing a punch against a surface of flexible film. A film sample is fixed in a specimen holder connected to a compression cell mounted on a dynamometer (an Instron tensile tester); when the dynamometer is started, a punch (a punching sphere, 5-mm in diameter, soldered on a plunger) is brought against the film sample (sealant layer) at a constant speed (30 cm/min) and the force needed to puncture the sample is graphically recorded. This test is representative of the abuse resistance of the packaging films. The results of this test are reported in Table 4 and 4a.

Curling Effect was measured according to an internal test method.

Curling is the rolling up which may take place when the edges of a piece of film are let naturally free from any constraint. The test is carried out in a conditioned room at 23° C. and 50% R.H. The films to be tested were taken at least 24 hours in such conditions before testing.

The FIGURE here attached helps clarifying this test.

Each specimen having dimensions 25 cm×25 cm is cut out from a film roll with the help of the metallic plate sized 25 cm×25 cm and of a cutter. Three specimens for the measurement of the curling in the longitudinal direction and three specimens for the measurement of the curling in the transverse direction were prepared The specimen is then put onto an aluminium plate sized 30×30 cm coated with Teflon (which prevents the electrostatic attraction between the film and the metallic platform). The aluminium plate also reports a ruler, as shown in the FIGURE.

The specimen must be positioned:
  between the marking lines and in such a way that the curling, if any, occurs facing the operator (i.e. not towards the platform);
  when testing LD samples, the longitudinal direction must be parallel to the ruler, while for TD measurements, the transverse direction must be parallel to the ruler.

Then the operator measures the curling (distance f, see the FIGURE below) taking the measurement at the point where the film is lifting up from the platform. Values "f" is measured both at the left and at the right side and the highest of these values in cm is recorded (f max). From this value (f max) the percentage compared to the initial dimension is calculated according to this formula: (f max/25)×100. In case f max is 25, curling is 100%, that is the specimen is completely rolled.

The measurement is taken at the point where the film is lifting up from the platform. The operator also takes notes of the direction of the curling of the films, i.e.: he reports if the specimen rolls up towards the interior or the exterior of the roll.

The FIGURE illustrates this test (keys: a) film roll (not represented); b) Specimen (with direction on film roll and platform); c) Teflon coated platform, lying on the table; d) marking lines; e) scales; f) curling.

Three specimens for each of the longitudinal and transverse direction were measured for each film and the average % curling value was reported in Table 4 and 4a.

Parallel Plate

This test is an indirect measurement of the seal strength of the film heat-sealed to itself (sealant layer on sealant layer). This is a highly demanding test.

A bag is confined between two metal parallel plates within a chamber which is in the form of a parallelepiped (height 75 cm, length 90 cm, width 32 cm) and which is kept at ambient temperature. The chamber is provided with an opening in the form of a round neck to insert the bag. The bag must be inserted for 400 mm of length of the same and the open mouth of the bag is pulled end up through the round neck. A nozzle is then inserted and the chamber is closed. A bag clamp is then activated to seal off and inflate the bag with air through the nozzle. A gauge pointer records the pressure raise during the inflation and up to the burst of the bag. The pressure is measured as IOW, Inch of Water.

Inches of water pressure is a non-SI unit for pressure. It is defined as the pressure exerted by a column of water of 1 inch in height at defined conditions. For example, at 39° F. (4° C.) at the standard acceleration of gravity, 1 IOW is approximately equal to 249 pascals (Pa) at 0° C. For each bag, the IOW pressure at burst (if any) was measured. The maximum IOW pressure recordable by the instrument is 270 IOW.

The films were converted as End Seal (curved end) bags by sealing on a bag making machine. Original bag dimensions were 350×800 mm; the length of the bags was reduced to 500 mm to perform the test. 10 bags were tested for each example.

The results of this test are reported in Table 4 (Examples) and 4a (Comparative Examples)

TABLE 4

| | | Example 1 | Example 2 | Example 3 | Example 4 | Example 5 |
|---|---|---|---|---|---|---|
| total thickness (μm) | | 95 | 80 | 74.9 | 90 | 95 |
| Puncture Resistance 23° C. (g) | | 22710 | 16830 | | | 13700 |
| Modulus (Kg/cm$^2$) | LD | 7580 | 7180 | | | 10100 |
| | TD | 6660 | 6690 | | | 10640 |
| Tensile (Kg/cm$^2$) | LD | 1550 | 1300 | | | 1390 |
| | TD | 1390 | 1240 | | | 1380 |

TABLE 4-continued

|  |  | Example 1 | Example 2 | Example 3 | Example 4 | Example 5 |
|---|---|---|---|---|---|---|
| Elongation | LD | 220 | 190 |  |  | 217 |
| (%) | TD | 190 | 144 |  |  | 178 |
| Free Shrink 85° C. | LD | 26 | 26 | 25 | 28 | 29 |
| (%) | TD | 40 | 36 | 34 | 39 | 42 |
| Max Shrink Tension | LD | 23 | 23 |  |  |  |
| (Kg/cm2) | TD | 32 | 30 |  |  |  |
| Residual Shrink | LD | 582 | 520 |  |  |  |
| Tension, 90° C. | TD | 819 | 605 |  |  |  |
| heating (g) |  |  |  |  |  |  |
| Gloss (g.u.) |  | 146 | 149 |  |  |  |
| Haze (%) |  | 3 | 4 |  |  |  |
| Haze after shrink |  | 9 | 12 | 20 |  |  |
| (%) |  |  |  |  |  |  |
| Parallel Plate[1] |  | average 250[2] | average 250[2] |  |  |  |
| Curling | LD | 0 | 0 |  | 0 | 0 |
|  | TD | 0 | 0 |  | 0 | 0 |

[1]bags of 350 × 800 mm,
[2]on 7 bags, no burst for 3 bags (higher than max value of 270)

TABLE 4a

|  |  | Comparative 1 | Comparative 2 | Comparative 3 |
|---|---|---|---|---|
| total thickness (μm) |  | 90 | 75 | 89.9 |
| Puncture Resistance 23° C. (g) |  | 24187 | 17657 |  |
| Modulus | LD | 8450 | 8120 |  |
| (Kg/cm²) | TD | 8230 | 8070 |  |
| Tensile | LD | 1160 | 1100 |  |
| (Kg/cm²) | TD | 1210 | 1320 |  |
| Elongation | LD | 130 | 190 |  |
| (%) | TD | 130 | 120 |  |
| Free Shrink | LD | 24 | 25 | 31 |
| 85° C. (%) | TD | 35 | 35 | 40 |
| Max Shrink | LD | 27 | 26 |  |
| Tension | TD | 36 | 38 |  |
| (Kg/cm²) |  |  |  |  |
| Residual Shrink | LD | 658 | 550 |  |
| Tension, 90° C. | TD | 875 | 728 |  |
| heating (g) |  |  |  |  |
| Gloss (g.u.) |  | 134 | 148 |  |
| Haze (%) |  | 12 | 9 | 5.3 |
| Haze after shrink (%) |  | 67 | 65 | 72 |
| Parallel Plate[1] |  | average 200 | average 200 |  |
| Curling | LD | ***OUTSIDE | *OUTSIDE |  |
|  | TD | 0 | 0 |  |

[1]bags 350 × 800 mm,
***90-100%;
**30-90%;
*<30%

The films of the present invention characterized by a specifically formulated adhesive (tie) layer (c) on at least one side of the barrier layer (1)), showed better optical properties after shrink than the comparative examples still keeping high shrink properties, see Table 4 and 4a respectively. Moreover, the parallel plate test demonstrated that the films of the invention have an excellent sealability, therefore are more "robust" and allows better performance at converting and during the handling of the bags at customer level.

In addition, the films of the present invention, notwithstanding the higher content of stiff resins, exhibit a reduced curling.

Finally, the Applicant surprisingly found that tie layer (c) can also ensure very good adhesion between the heat sealable layer and, if present, the polyamide, polyester, or styrene-base polymers layer(s).

In conclusion, the peculiar content and proper disposition of the layers in said multilayer films comprising a PVDC barrier layer allow the incorporation of significant amount of stiff resins, resulting in asymmetric stiff films, which are surprisingly endowed with negligible curling, as well as good optical, shrink and abuse properties.

Although the present invention has been described with reference to the preferred embodiments, it is to be understood that modifications and variations of the invention exist without departing from the principles and scope of the invention, as those skilled in the art will readily understand. Accordingly, such modifications are in accordance with the claims set forth below.

The invention claimed is:

1. A multilayer heat-shrinkable film comprising a tie layer directly adhered to a surface of a barrier layer, the barrier layer comprising polyvinylidene chloride and the tie layer comprising a polymer blend comprising:
   a. from 50% to 85% by weight of at least a modified ethylene/alpha-olefin copolymer;
   b. from 50% to 15% by weight of at least a modified ethylene and vinyl acetate copolymer, said modified ethylene and vinyl acetate copolymer having a percentage by weight of vinyl acetate between 6% and 15%.

2. The multilayer heat-shrinkable film of claim 1 further comprising an outer heat sealable layer.

3. The multilayer heat-shrinkable film of claim 1, wherein the barrier layer is an inner layer of the multilayer heat-shrinkable film.

4. The multilayer heat-shrinkable film of claim 1 having a total free shrink at 85° C. of at least 40%.

5. The multilayer heat-shrinkable film of claim 1, wherein the modified ethylene/alpha-olefin copolymer comprises at least one member selected from modified heterogeneous polymer, modified homogeneous polymer, modified very low density polyethylene, and modified ultralow density polyethylene, and the modified ethylene and vinyl acetate copolymer is anhydride modified.

6. The multilayer heat-shrinkable film of claim 1, wherein the modified ethylene/alpha-olefin copolymer is an ethylene/alpha-olefin copolymer comprising at least one anhydride functionality grafted thereon and/or copolymerized therewith and/or blended therewith.

7. The multilayer heat-shrinkable film of claim 1, wherein the density of the modified ethylene/alpha-olefin copolymer is in the range from 0.905 g/cc to 0.927 g/cc, and/or the Melt Flow Index of the modified ethylene/alpha-olefin copolymer, measured at 190° C., 2.16 kg (ASTM 01238) is in the range from 2 to 10 g/10 min.

8. The multilayer heat-shrinkable film of claim 1, wherein the Melt Flow Index of the modified ethylene/vinyl acetate copolymer is in the range from 2.0 to 5.5 g/10 min, measured at 190° C., 2.16 kg, as per ASTM 01238) and/or the melting point is from 87 to 100° C.

9. The multilayer heat-shrinkable film of claim 1, wherein the polymer blend of the tie layer comprises from 65% to 75% by weight of at least a modified ethylene/alpha-olefin copolymer having a density between 0.910 and 0.920 g/cc and from 35% to 25% by weight of at least a modified ethylene/vinyl acetate copolymer having a percentage by weight of vinyl acetate between 6% and 15%.

10. The multilayer heat-shrinkable film of claim 1 having an oxygen transmission rate below 100 cm3/m2·day·atm at 23° C. and 0%, according to ASTM D-3985.

11. The multilayer heat-shrinkable film of claim 1 having a haze after shrink of lower than 40%, measured according to ASTM D1003.

12. The multilayer heat-shrinkable film of claim 1, wherein said anhydride functionality is selected from anhydride of maleic acid, anhydride of crotonic acid, anhydride of citraconic acid, anhydride of itaconic acid and anhydride of fumaric acid.

13. The multilayer heat-shrinkable film of claim 2 comprising at least two tie layers directly adhered respectively on said first and second surface of the inner barrier layer, said tie layers containing a blend comprising 50 to 85 wt % modified ethylene/alpha-olefin copolymer and 50 to 15 wt % modified ethylene/vinyl acetate copolymer having 6 to 15 wt % vinyl acetate.

14. The multilayer heat-shrinkable film of claim 13 further comprising at least one stiff resin layer comprising a polymer selected from the group consisting of polyester, polyamide, styrene-based polymer, and blends thereof.

15. The multilayer heat-shrinkable film of claim 14, wherein:
   a. the polyester is present in the film in an amount of from 3 to 50 wt % based on total film weight, and/or,
   b. the polyamide is present in the film in an amount of from 5 to 55 wt % based on total film weight, and/or
   c. the film contains polyamide and/or polyester in an amount of at least 20%, based on total film weight.

16. The multilayer heat-shrinkable film of claim 14, having the following sequence of layers:

A/C/D/C/B/C/E/D/E/D wherein:
   a. layer (A) is the first outer heat sealable layer,
   b. layer (B) is the inner barrier layer comprising polyvinylidene chloride,
   c. layers (C) are the tie layers containing the blend comprising 50 to 85 wt % modified ethylene/alpha-olefin copolymer and 50 to 15 wt % modified ethylene/vinyl acetate copolymer having 6 to 15 wt % vinyl acetate,
   d. internal layers (D) are stiff resin layers comprising polyamide,
   e. outer layer (D) is the second outer layer, outer layer (D) comprising polyester, and
   f. additional layers (E) comprise modified ethylene/vinyl acetate copolymer.

17. A process for the manufacture of a multilayer heat-shrinkable film comprising the steps of:
   a. Coextruding a tubular substrate comprising:
      I. a heat sealable layer;
      II. a barrier layer comprising polyvinylidene chloride; and
      III. a tie layer directly adhered to a surface of the barrier layer, the tie layer comprising a polymer blend comprising:
         i. from 50% to 85% by weight of at least a modified ethylene/alpha-olefin copolymer;
         ii. from 50% to 15% by weight of at least a modified ethylene and vinyl acetate copolymer, said modified ethylene and vinyl acetate copolymer having a percentage by weight of vinyl acetate between 6% and 15%; and
   b. quenching the tubular substrate.

18. The process for the manufacture of a multilayer heat-shrinkable film according to claim 17, wherein the quenching the tubular substrate is at a temperature of from 5 to 15° C. and the process further comprising the steps of:
   a. extrusion coating the substrate with any remaining layers, thus obtaining an unoriented tubular film,
   b. quenching the unoriented tubular film at a temperature of from 5° C. to 30° C.,
   c. heating the tubular film to a temperature which is above the Tg of all the polymeric resins composing the layers and below the melting temperature of at least one of the resins employed,
   d. biaxially orienting the tubular film at orientation ratios an orientation ratio of from about 2 to about 6 in each direction, and
   e. quenching the oriented tubular film in cold air, at a temperature from 4 to 30° C. 30° C., preferably from: 5 to 10° C.

19. The process for the manufacture of a multilayer heat-shrinkable film of claim 17 wherein the multilayer heat-shrinkable film has a haze after shrink of lower than 40% as measured according to ASTM D 1003.

20. The process for the manufacture of a multilayer heat-shrinkable film of claim 17 further comprising the step of packaging a product within the multilayer heat-shrinkable film.

* * * * *